Inventor:
Walter T. Gollwitzer
By Wallace and Cannon
Attorneys

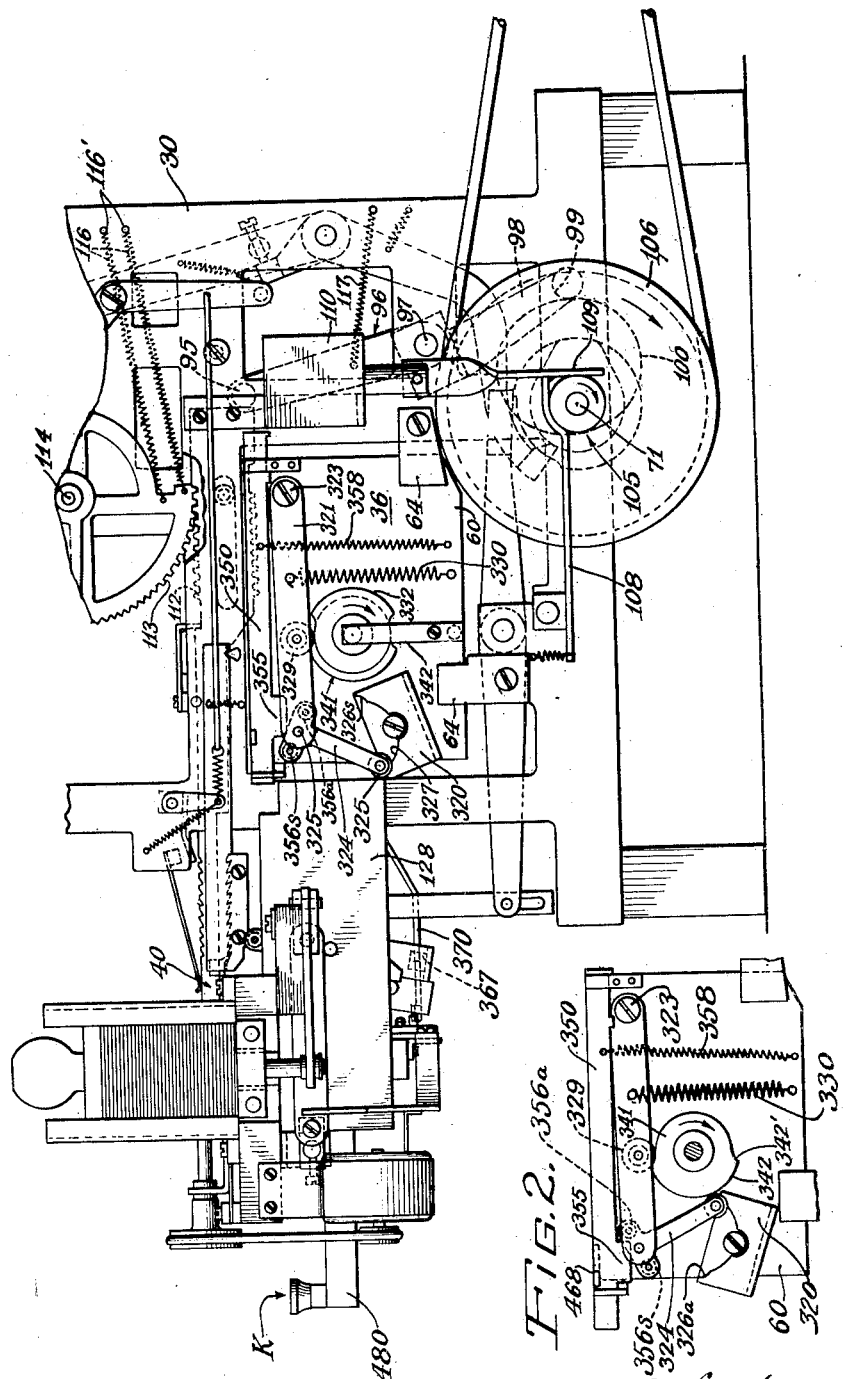

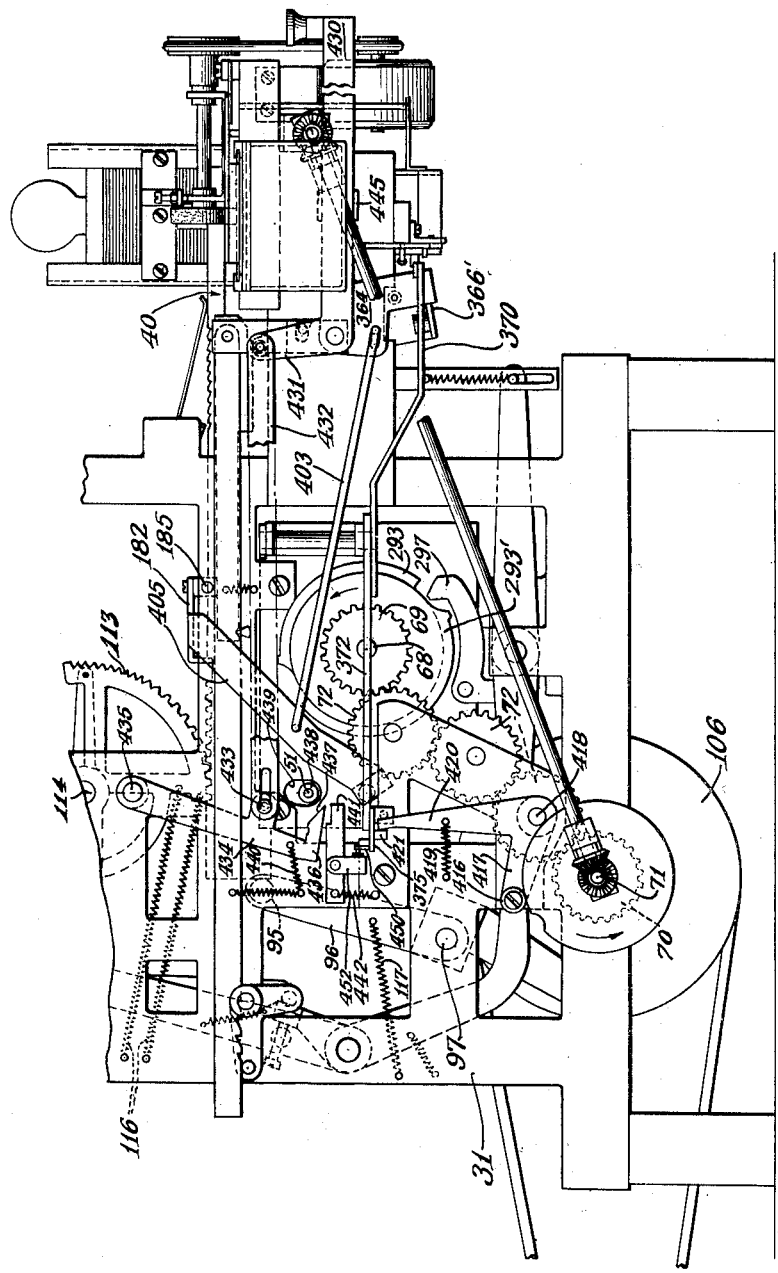

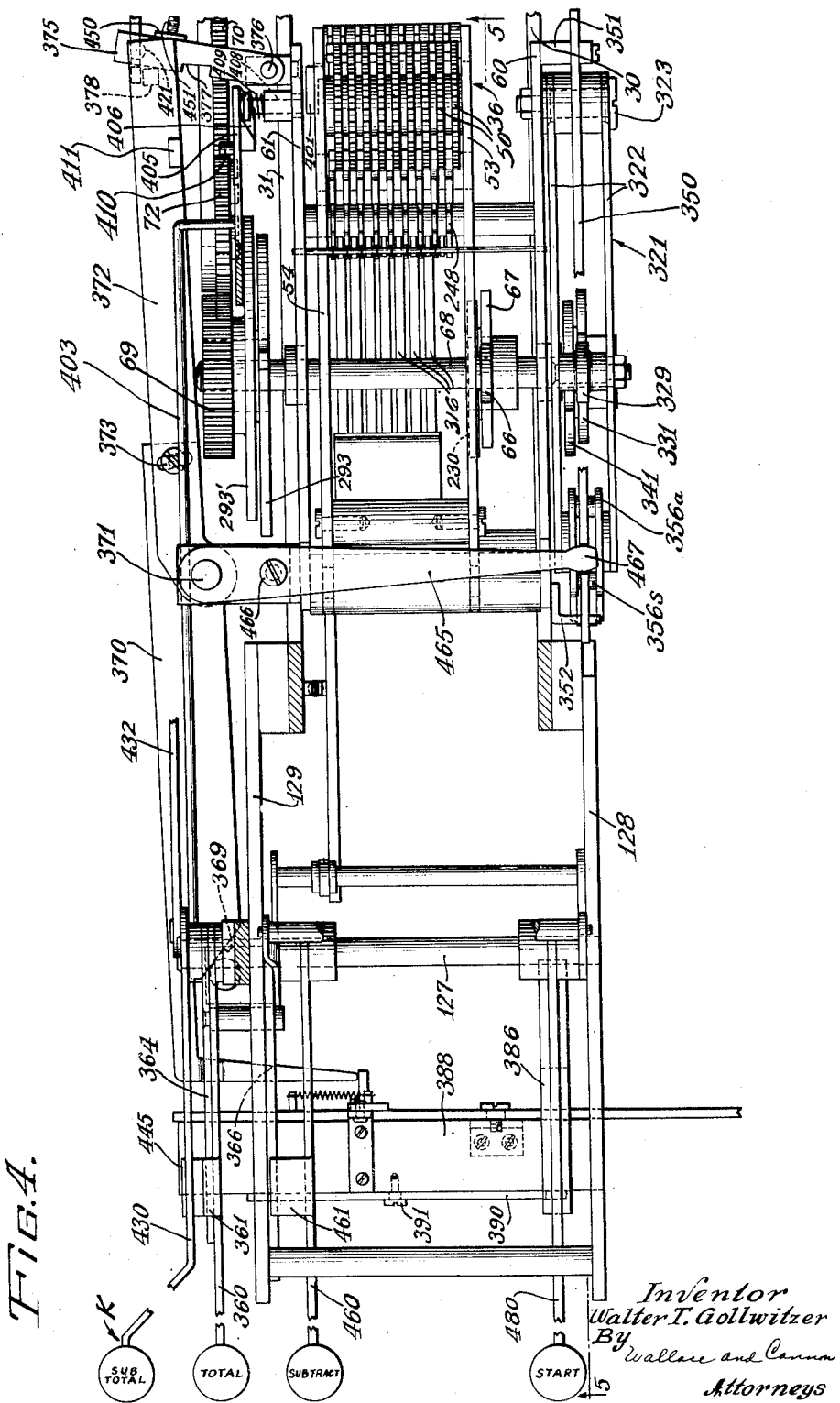

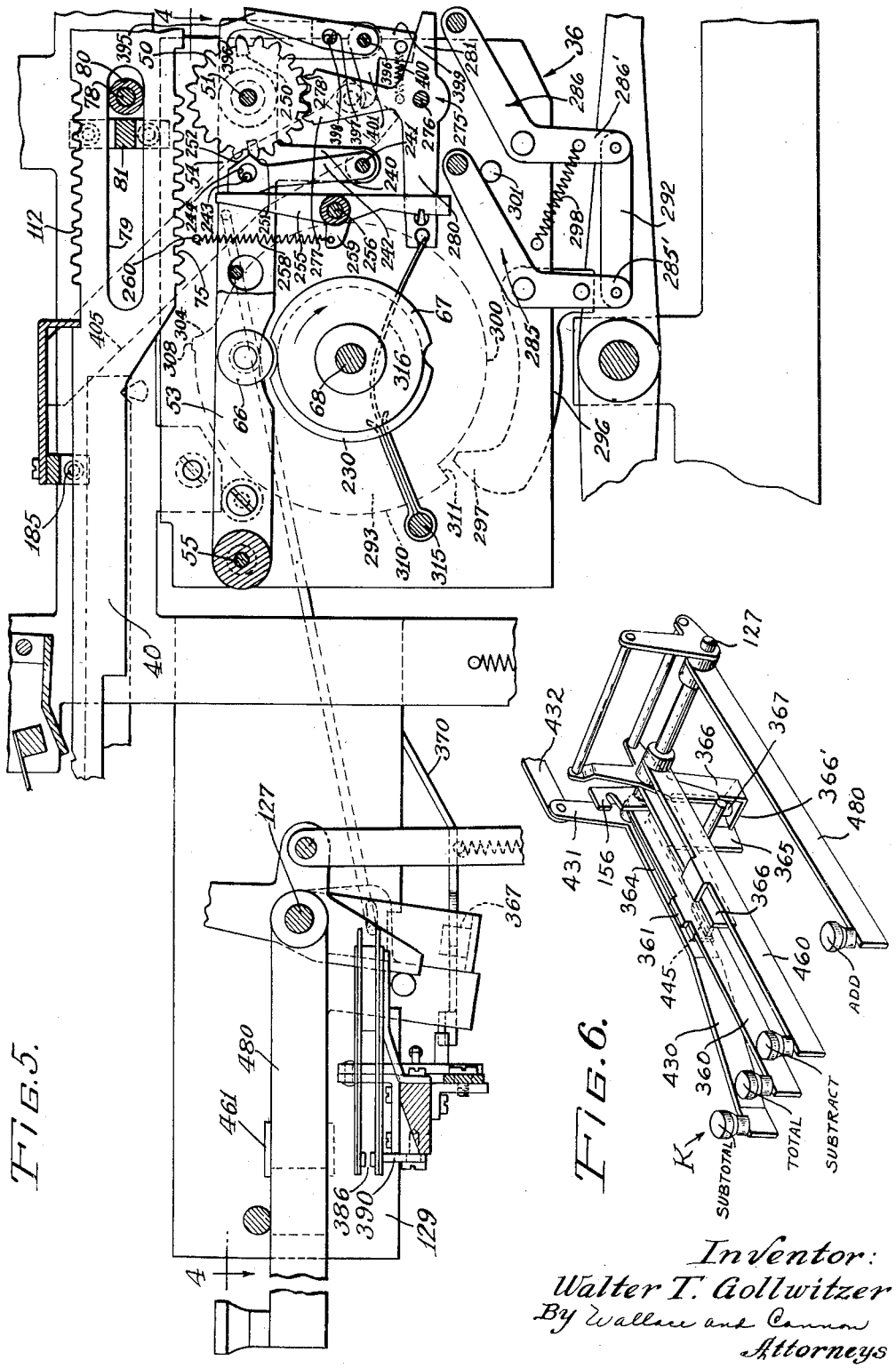

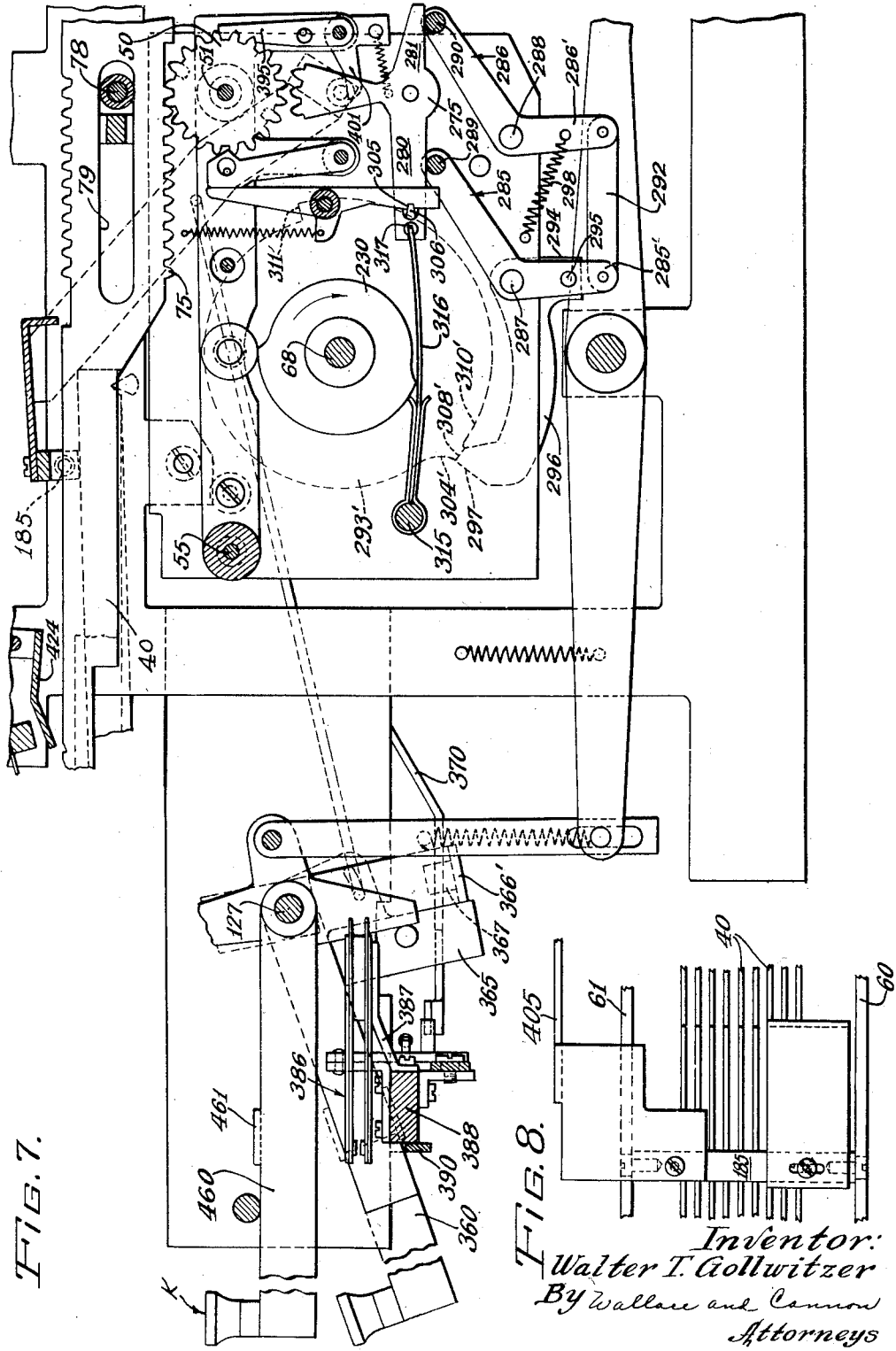

Inventor:
Walter T. Gollwitzer
By Wallace and Cannon
Attorneys

March 7, 1950     W. T. GOLLWITZER     2,500,069
PRINTING MACHINE
Filed March 8, 1943     9 Sheets-Sheet 8

Fig. 17.

SUBTRACTION CYCLE

- ACCUMULATOR CAM SHAFT UNLATCHED AND RETURNED SLIDE 350 RETURNED TO NORMAL
- CLUTCH TRIP ACCUMULATOR CAM SHAFT SHIFTED AND LATCHED SPRING TENSIONING SLIDE 350 SHIFTED
- ACCUMULATOR WHEELS ENGAGE SET-UP BAR
- RESTORE CARRY SEGMENTS
- SET-UP BAR RETURN COMPLETED
- SET-UP BARS START REARWARDLY
- CARRY SPRINGS DETENSIONED AND LINK 324 SHIFTED
- CARRY SEGMENTS CONDITIONED
- CARRY SPRINGS TENSIONED SUBTRACTIVELY
- SET-UP BAR DWELL
- CARRY EFFECTED
- SET-UP BARS STOPPED
- SET-UP BARS START RETURN
- ACCUMULATOR WHEELS ENGAGE CARRY SEGMENTS

Fig. 18.

ADDING CYCLE

- CARRY EFFECTED
- CLUTCH TRIP
- ACCUMULATOR WHEELS START TO ENGAGE CARRY SEGMENTS
- DWELL FOR SET-UP BARS
- SET-UP BAR RETURN COMPLETED
- SET-UP BARS START REARWARDLY
- CARRY SPRINGS TENSIONED ADDITIVELY
- CARRY SEGMENTS CONDITIONED
- SET-UP BARS START RETURN
- ACCUMULATOR WHEELS HAVE ENGAGED
- CARRY SPRINGS BEING DETENSIONED
- SET-UP BARS STOPPED
- RESTORE CARRY SEGMENTS
- SET-UP BAR DWELL

Inventor:
Walter T. Gollwitzer
By Wallace and Cannon
Attorneys

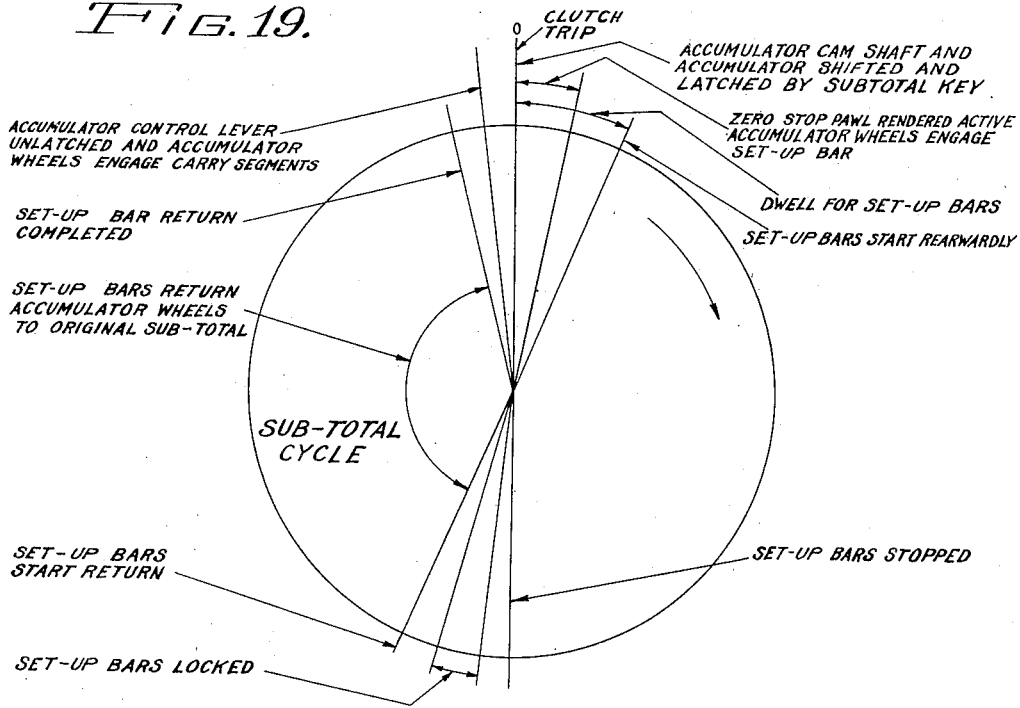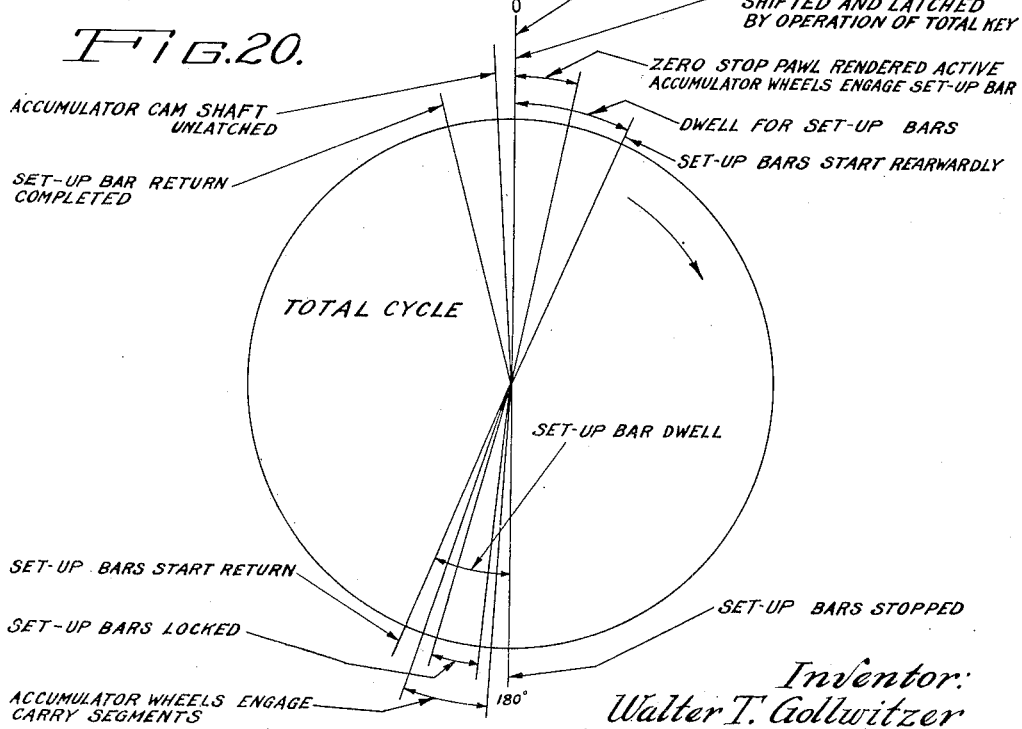

Patented Mar. 7, 1950

2,500,069

UNITED STATES PATENT OFFICE 2,500,069

PRINTING MACHINE

Walter T. Gollwitzer, Euclid, Ohio, assignor to Addressograph-Multigraph Corporation, Wilmington, Del., a corporation of Delaware Application March 8, 1943, Serial No. 478,377

7 Claims. (Cl. 235—60.31)

This invention relates to accumulating mechanism and particularly to accumulating mechanism adapted for the entry of numerical items in either an additive or a subtractive sense.

In prior accumulators adapted for either addition or subtraction it has been customary to provide different entry effecting means for the two types of operations. In some instances this has involved the use of a single set of accumulator wheels adapted for selective association with one or the other of two sets. In such prior accumulators it has also been necessary to provide two different sets of carry mechanism, one of which is arranged to operate in the subtracting cycles and the other of which is arranged to operate in the adding cycles of the machine. In other instances this has involved the use of a pair of inter-meshed sets of accumulator pinions adapted for selective association with a single set of entry racks, and in such cases the carry-over mechanism has required but one set of carry-over racks or the like with which one or the other of the two sets of accumulator wheels must be selectively associated to determine the direction of entry of carry-over or tens-transfer amounts. The provision of such duplicate mechanism of course entails added complexity of the machine and added cost thereof, and in view of this it is an important object of this invention to enable the structure of such accumulator mechanism to be materially simplified; and an object related to the foregoing is to enable either additive or subtractive entries to be made where but a single set of accumulator pinions and a single set of entry effecting devices such as racks are employed. A further object related to the foregoing is to enable a single carry-over mechanism to introduce carry-overs directly into an accumulator in either a subtractive or an additive direction.

In the use of an accumulator mechanism the elements of the carry-over devices are ordinarily displaced by spring means as an incident to an entry of a carry-over into an order of the accumulator, and when the actual carry-over movement is being effected it is desirable to exert a substantial spring pressure so as to thereby assure that the carry-over will be properly entered, and when such a heavy spring pressure is used, it will be evident that the problem of restoring the carry-over mechanism to its normal relationship would ordinarily involve the provision of means to overcome this relatively heavy spring pressure. In view of this objectionable feature or condition, it is a further object of this invention to enable the spring pressure on the carry mechanism to be varied in the cycle of operation of the accumulator mechanism to thereby afford heavy spring pressure in the proper direction when a carry-over is to be entered into the accumulator and to afford a relatively slight spring pressure at all other times.

It is a further object of the present invention to enable the carry-over devices, which as hereinbefore pointed out are operable to effect carry-over entries in either direction, to be actuated in either direction by a single spring means, and an object related to the foregoing is to enable the direction of effectiveness of a single spring means upon a carry-over mechanism to be selectively determined as an incident to the determination of the type of cycle through which the machine is to be operated. Further objects related to the foregoing are to enable a single carry-over mechanism which may be actuated in either direction from a normal position to be controlled by a single set of latch devices which act to restrain the carry-over devices against movement in both directions, and to enable such carry-over mechanism to be readily and easily restored to the normal position from either of the positions to which it may be actuated in the course of a carry-over entry effecting operation.

Other and further objects are to associate an accumulator with an entry effecting means and a carry-over means in a novel manner whereby simplicity of structure and accuracy of operation are attained; to enable the different types of cycles of the mechanism, including total and subtotal cycles, to be readily and easily initiated and controlled; and to enable control of the accumulator mechanism in such cycles to be attained in a simple and expeditious manner.

Other and further objects of the present invention will be apparent from the following description and claims and are illustrated in the accompanying drawings which, by way of illustration, show a preferred embodiment and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In the drawings:

Fig. 1 is a side elevational view of an accumulator mechanism embodying the features of the invention;

Fig. 2 is a fragmental portion of Fig. 1 showing certain parts of the control mechanism in the positions which they occupy in a subtractive cycle;

Fig. 3 is a side elevational view of the other side of the machine of this invention;

Fig. 4 is a fragmental plan view taken substantially along the line 4—4 of Fig. 5;

Fig. 5 is a fragmental vertical sectional view taken substantially along the line 5—5 in Fig. 4;

Fig. 6 is a perspective view illustrating the form and relationship of the control key levers;

Fig. 7 is a view similar to Fig. 5 and illustrating the parts of the mechanism in the positions which they occupy at the beginning of a total-taking cycle of the machine;

Fig. 8 is a fragmental plan view showing a portion of the mechanism illustrated in Fig. 7;

Figure 14:
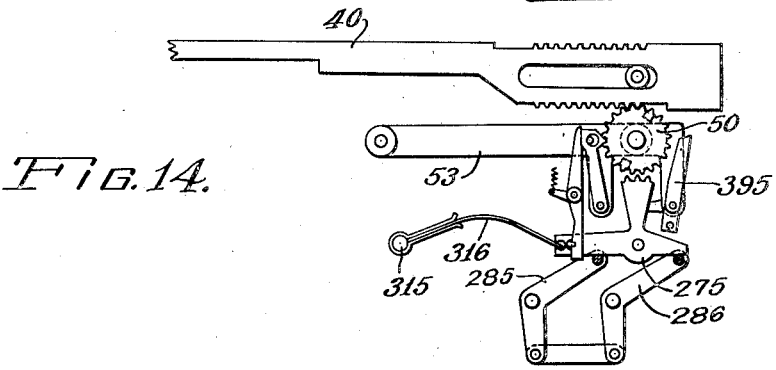
Figure 15:
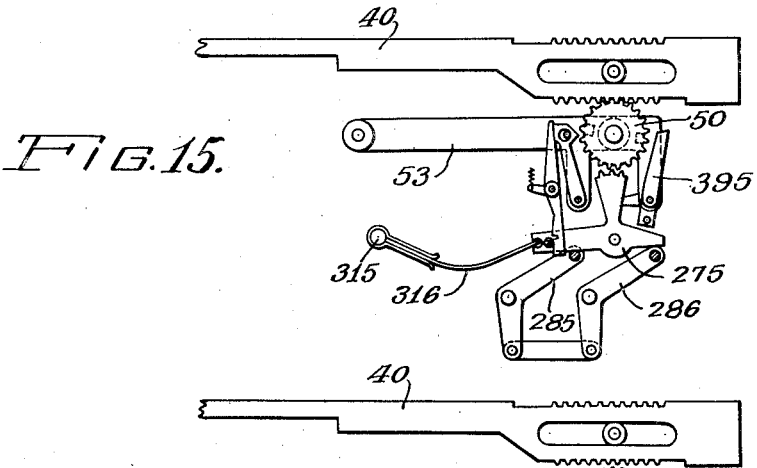
Figure 16:
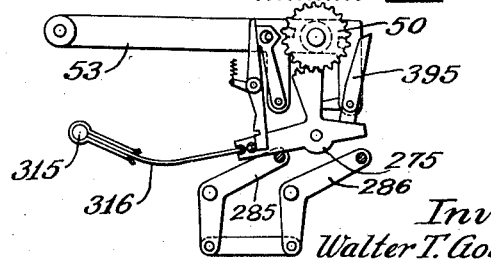

Figs. 9 to 13 inclusive are diagrammatic views illustrating the different relationships which the parts of the accumulator mechanism assume in the adding cycles thereof;

Figs. 14 to 16 inclusive are diagrammatic views illustrating the different relationships which the parts of the accumulator mechanism assume in the course of a subtracting operation;

Fig. 17 is a timing chart of the subtracting cycle of the machine of this invention;

Fig. 18 is a timing chart of the adding cycle of the machine;

Fig. 19 is a timing chart of the subtotal cycle of the machine; and

Fig. 20 is a timing chart of the total cycle of the machine.

The accumulator mechanism of the present invention is arranged to accumulate either positive or negative numerical amounts, and is adapted to have printing means associated therewith whereby the numerical items or amounts may be printed upon a suitable record sheet and whereby totals or subtotals may be printed upon such a sheet when desired. The amounts to be entered into the accumulator may of course be set up in many different ways, but in the form illustrated means is adapted to have the numerical amounts set up under control of data bearing cards or records, the numerical amounts represented in such records being sensed and entered into the accumulator.

While the accumulator mechanism as herein illustrated is arranged for manual selection of the type of operative cycle which is to be performed, the arrangement and construction of the unit are such as to be adapted for incorporation of the unit as a part of a larger or multi-unit machine, and in such uses of the present mechanism a greater degree of automatic control would, of course be attained. Thus, as shown in Figs. 1 and 4 of the drawings, the accumulating mechanism is mounted in a frame which includes a pair of spaced side frame members 30 and 31, and the accumulating mechanism 36 is disposed between the side frames 30 and 31, and means including a plurality of set-up bars 40 are provided for operating the accumulator mechanism 36. In accordance with this invention the set-up bars 40 serve to enter the desired numerical amounts with the accumulator in either an additive or subtractive direction, and as herein shown the set-up bars 40 extend forwardly or to the left in Figs. 1 and 4 so as to enable these bars to be differentially set as by means of a card sensing mechanism of the general character shown in my Patent No. 2,296,277, patented September 22, 1942, particular reference being made to Figs. 120 to 124 of such patent.

The accumulator 36 includes a plurality of accumulator wheels 50, Figs. 4, 5 and 7, there being an accumulator wheel 50 for each set-up bar 40. These accumulator wheels 50, in the present instance, are in the form of gears and are rotatably mounted on shouldered collars, these collars each including a shoulder of sufficient thickness to accommodate an accumulator wheel. The collars are mounted on a shaft 51 about which therefore the accumulator wheels 50 are supported for rotation, the shaft 51 being fast to the outer ends of the arms 53 and 54 which are pivotally mounted on spacing collars carried by a shaft 55 which in turn is carried by side plates 60 and 61 of the accumulator unit 36, Fig. 4. The side plate 61 is directly fastened to the inner face of the side frame 31 and lugs as 64, Fig. 1, provided on the side plate 61, are detachably connected to the side plate 31, this mounting of the side plates 60 and 61 providing a detachable mounting for the accumulator unit 36, the various parts of which are carried by the side plates 30 and 31.

The arms 53 and 54 are connected together to move as a unit and mounted therebetween substantially midway in the extent thereof is a roller 66 that may ride on the periphery of a cam 67 fast on a shaft 68 journaled in the side plates 60 and 61. A gear 69, Fig. 4, fast on the cam shaft 68 outwardly of the side plate 61 receives motion from a gear 70 fast on a main cam shaft 71 of the mechanism through idler pinions as 72 so that each time the main cam shaft 71 is set in rotation, in the manner hereinafter described, the gear 69 and, therefore, the accumulator cam shaft 68 are caused to make a complete revolution, the ratio between the gears being such that the accumulator cam shaft 68 rotates synchronically with the main cam shaft 71.

In the course of rotation of the cam 67 with the accumulator cam shaft 68, a rise on this cam engages the roller 66 and pivots the arms 53 and 54 in such a manner that the accumulator gear wheels as 50 are respectively engaged with the racks 75 formed on the lower edges of the set-up bars 40, each accumulator gear wheel 50 being respectively aligned with a rack 75. By selective engagement with the racks 75 during particular portions of the longitudinal movements of the set-up bars 40, the desired numerical amounts are entered either additively or subtractively into the accumulator wheels 50, as will hereinafter be described in detail, but for present purposes it should be observed that when an additive entry is to be made, the accumulator wheels 50 are engaged with the racks 75 during the forward or restoring movement of the set-up bars 40, thereby to actuate the accumulator wheels 50 in a counterclockwise direction, Fig. 5; while in a subtracting operation the accumulator wheels 50 engage the racks 75 while the set-up bars 40 move rearwardly, thereby to actuate the accumulator wheels 50 in a clockwise direction, Fig. 5.

The set-up bars 40 are mounted and guided for sliding movement as by means of a supporting shaft 78 extending between the side frames 30 and 31, the shaft 78 being extended through longitudinal slots 79 formed in the rear ends of the set-up bars 40. Preferably the shaft 78 has an individual roller 80 mounted thereon for engagement with the slot 79 in each set-up bar 40. The set-up bars 40 are also engaged with a slotted guide bar 81 extended between the side frames 30 and 31 just forwardly of the shaft 78. Thus the rear ends of the set-up bars 40 are accurately supported and guided, and the forward ends thereof are accurately guided in a lateral sense by suitable means, as for example, in the manner shown in my aforesaid patent.

The set-up bars 40 are reciprocated in each operation of the accumulator 36 and, for the purpose of imparting such reciprocatory movement to these bars, a roller 95, Figs. 1 and 3, is extended past the inner or rear ends of the set-up bars 40, and in a manner explained presently, springs act on the set-up bars to maintain the ends thereof engaged with the roller 95. This roller is mounted on a shaft carried by a double armed rocker 96 fast to the shaft 97 journaled in suitable bearings in the side plates 30 and 31. A depending arm 98 is clamped to the shaft 97 so as to afford an adjustable connection between this arm and the shaft 97. The arm 98 has a roller 99 mounted at the free end thereof and this roller bears against the periphery of a cam 100 fast on the shaft 71, the roller 99 being urged into engagement with the periphery of the cam 100 by the aforesaid springs acting on the set-up bars 40.

Rotary movement is imparted to the main cam shaft 71 through a clutch 105, such as is disclosed in my Patent No. 2,265,133, patented December 9, 1941. This clutch 105 comprises a driving member such as a pulley 106 that is rotatable on the shaft 71, and a driven member that is slidably but nonrotatably mounted on the shaft 71, the driven member being urged toward engagement with the driving member 106 and being governed by a disengaging cam 108 and a clutch trip pawl 109. The cam 108 is operative, as described in the aforesaid Patent No. 2,265,133, to disengage the clutch 105 after the shaft 71 has operated through one revolution and when the clutch is to be again engaged, the trip pawl 109 is momentarily actuated in an upward direction by means such as a solenoid 110, Fig. 1. In the course of each rotation of the main cam shaft 71, induced by energization of the solenoid 110 and which connects the shaft 71 to the pulley 106 to bring about a complete rotation of the shaft 71, the cam 100 acts on the roller 99 and through the arm 98 to rock the shaft 97 and therefore the rocker 96 which in such an event moves in a clockwise direction, as viewed in Fig. 1, at the start of an operation. This action serves to withdraw the roller 95 in a rearward direction so as to permit rearward sensing movement of the set-up bars 40, as will hereinafter be described in detail.

Each set-up bar 40 has a rack 112 formed in the upper edge thereof and such racks mesh with gear segments 113 that are rotatably mounted on a shaft 114 which may serve to associate the bars 40 with a printing mechanism of the kind shown in the first mentioned of my aforesaid prior patents, and springs as 116 extend between each gear segment as 113 and pins as 116' extended between the side plates 30 and 31. It is the action of the springs as 116 on the gear segments as 113 through the respective racks as 112 which are effective to engage the set-up bars 40 with the roller 95 and this spring pressure is normally effective through the rocker 96, shaft 97 and arm 98 to hold the roller 99 in engagement with the periphery of the cam 100. However, I prefer also to provide an additional spring 117 acting on the rocker 96 to assure contact of the cam follower 99 with the cam 100 under all conditions.

At the time the rocker 96 starts to move clockwise, as viewed in Fig. 1, the gear segments 113 are positioned relative to the rack 112 in the manner shown in Fig. 1 and in the course of the advancing or rearward movement of the set-up bars 40 induced as an incident to such clockwise movement of the rocker 96, the gear segments 113 move relative to the rack 112 into different positions. The position which the gear segment 113 will assume in the course of such movement of the set-up bars 40 is determined by the position attained by these bars in the course of advancing movement thereof, and such position of the set-up bars is determined in the adding or subtracting cycles of the machine by the set-up mechanism with which the bars 40 are associated.

Where the accumulator mechanism of this invention is to be set up automatically under the control of record cards or the like, such automatic card control may, of course, govern the type of cycle of machine operation so as to cause selective addition or subtraction of numerical amounts represented on the record cards, but in the present instance, each cycle of machine operation is initiated manually by selective actuation of the appropriate one of a plurality of control keys K, Figs. 1, 4, and 6 which govern the type of machine cycle which is to be performed.

In the operation of the present mechanism to introduce numerical amounts into the accumulator in an additive sense, the accumulator wheels 50 are maintained in their lower position as shown in Fig. 5 during the rearward sensing or set-up operation of the set-up bars 40. Thus in an adding cycle the rocker 96 and the roller 95 carried thereby are first rocked in a clockwise direction, Fig. 1, and during such movement the accumulator wheels 50 are maintained disengaged, or in other words, in their lower positions as shown in Fig. 5. Thus the set-up bars 40 are free to the action of the springs 116 and are moved through distances which are determined by the associated set-up means. By the time the clockwise movement of the rocker 96 is completed all of the set-up bars will have attained the positions in which they are to stop by reason of the setting of the associated set-up means. Hence the set-up bars 40, at the time when the clockwise movement of the rocker 96 has been completed, will be positioned to represent a digital count corresponding with the numerical amount.

After the set-up bars 40 have thus been set in accordance with the desired values or digits, the cam 67 is operative upon the roller 66 and the frame formed by the arms 53 and 54 to elevate the accumulator wheels 50 into engagement with the racks 75 of the set-up bars 40, and hence in the restoring movement of the set-up bars 40, as will be hereinafter described, the desired numerical amount will be introduced in an additive sense into the accumulator wheels 50 by rotation thereof in a counterclockwise direction as viewed in Fig. 5.

When the rocker 96 starts to move counterclockwise, as viewed in Fig. 1, the roller 95 comes into engagement with the ends of the set-up bars 40 that have been arrested in positions representative of significant digits, and after the roller has moved into engagement with the ends of these bars the bars thereafter move with the rocker 96 and return to their initial or zero positions. Hence, since the set-up bars have been previously set up to represent a digital count, and as the accumulator gear wheels 50 are by this time meshed with the racks 75, it follows that in the return of the set-up bars 40 rotation is imparted to the gear wheels 50 in an amount proportionate to the digital count to which the respective set-up bars have been set to represent.

Therefore, the digital count represented by the set-up bars 40 will be transferred to the accumulator wheels 50 in an additive sense.

It will be manifest that as various digital values are entered or added into the accumulator wheels as aforesaid, more than ten digits will be entered into a particular wheel 50 and as the tenth digit is entered into a particular wheel it is necessary that a carry-over be made into the order next higher than that to which a particular wheel pertains, and hence an arrangement is provided which will effect such carry-overs. It has been pointed out hereinbefore that the present invention contemplates entry of numerical amounts into the accumulator in either an additive or a subtractive sense, depending upon the sense in which the numerical amounts are being introduced in the operation in which such carry-overs arise. Since the carry-over mechanism of the present invention is operable to introduce carry-overs in either an additive or subtractive sense, the cycle of operation of the accumulator in the entry of amounts in a subtractive sense will be discussed in detail prior to the description of the carry-over mechanism.

When a numerical amount is to be introduced into the accumulator in a subtractive sense, the accumulator wheels 50 are elevated into engagement with the racks 75 prior to the initial or rearward movement of the set-up bars 40, and hence as the clockwise movement of the rocker 96 releases the set-up bars 40 for rearward or sensing movement, these set-up bars are operatively connected to the accumulator wheels 50. Hence as a particular set-up bar 40 moves in a rearward direction to a desired set position, this movement which is representative of the value of the desired digit is imparted to the associated accumulator wheel 50 in a clockwise or subtractive direction, and hence the desired digital value is entered subtractively into the related accumulator wheel 50. When the clockwise movement of the rocker 96 has been completed, all of the set-up bars 40 are, in effect, set to represent the numerical values which have been subtractively entered into the accumulator wheels 50. The accumulator wheels are then lowered out of engagement with the rack 75 and to the position shown in Fig. 5, this being accomplished by a cam 230 which is rendered operative upon the cam roller 66 in a subtracting cycle in a manner which will be hereinafter described in detail. Thus, as the rocker 96 moves through its forward stroke in a counterclockwise direction, the roller 95 thereof will come into engagement with the rear ends of the set-up bars 40 so as to restore the same to their normal positions shown in Fig. 5 of the drawings. Since the accumulator wheels 50 are in their lower positions during such restoring movement of the set-up bars 40, it will be obvious that the accumulator wheels will, during this period, normally remain in the positions to which they have been set during the first half of the cycle of operation.

As hereinbefore pointed out, the accumulator wheels 50 are adapted for selective actuation in either direction, and the present accumulator is therefore provided with carry-over means whereby the requisite carry-overs may be introduced in either direction. To this end the arms 53 and 54 are provided with downwardly extending lugs 240 between the lower ends of which the mounting shaft 241 is extended. A plurality of pawls 242 are mounted on the shaft 241 so as to extend upwardly therefrom, and a stationary rod 243 extended between the arms 53 and 54 extends through openings 244 in the pawls 242 so as to limit rocking movement of the pawls 242 about the mounting shaft 241.

The pawls 242 are so disposed along the mounting shaft 241 that the upper ends thereof are disposed in alignment with, or in the plane of the respective thickened teeth 250 of the accumulator wheels 50. The accumulator wheels 50 in the present instance are formed so as to have 20 teeth thereon, and two wide or thickened teeth 250 are provided on each accumulator wheel at diametrically opposite points thereon. When an accumulator wheel 50 is in its zero position, one of the thickened teeth 250 is in engagement with a cam surface 251 on the head of the associated pawl 242, and as this accumulator wheel is advanced in an adding or counterclockwise direction, as viewed in Fig. 5, so as to represent a digital value of "9," the other one of the thickened teeth 250 is moved to a position wherein it engages an oppositely disposed cam surface 252 on the head of the associated pawl 242. Each pawl 242 is held in the position shown in Fig. 5 by a pivoted arm 255, a plurality of such arms 255 may be mounted on a supporting shaft 256 which is extended between the side plates 60 and 61 of the accumulator. The levers 255 are accurately spaced upon the shaft 256 by suitable spacing collars, and the levers are individually biased into engagement with the adjacent edges of the related pawls 242 near the ends thereof by individual biasing springs 258 acting between the laterally extending arms 259 on the respective levers and a common anchoring shaft 260 which is extended between plates 60 and 61.

The pawls 242 are arranged to serve as individual actuating means for the levers 255, and these levers are utilized as latching means to control operation of carry segments 275 which are adapted to be rendered operative upon those accumulator wheels which are allocated to the orders higher than the units order of the accumulator. The carry segments 275 are suitably mounted in spaced relation upon a supporting shaft 276 extended between the plates 60 and 61, and each carry segment has an upwardly projecting arm 277 having a plurality of gear teeth 278 formed thereon in a position to be engaged by the related one of the accumulator wheels 50 when the accumulator is moved to its lower position of Fig. 5; and in addition, each carry segment 275 has arms 280 and 281 projecting in opposite directions for cooperation with governing means which control the operative or active movements of the carry segments 275.

Since the carry segments 275 may, in the operation of the machine, be actuated and displaced in either rotative direction from their normal positions of Figs. 5 and 7, means are provided for imparting restoring movements to the carry segments 275 in both directions, and the arrangement is such that regardless of which way the carry segments have been displaced, the requisite restoring movement will be applied thereto. To this end a pair of generally similar restoring bails 285 and 286 are mounted on parallel axes 287 and 288 extended between the plates 60 and 61, and the arrangement is such that the cross bar 289 of the bail 285 is disposed beneath the arms 280 of the carry segments 275 while the bar 290 of the bail 286 is disposed beneath the arms 281 of the carry segments. The side arms of the two bell cranks 285 and 286 are fixed to the shafts 287 and 288, and at at least one end of each shaft, the side arms of the bails are extended downwardly as shown at 285' and 286' in Fig. 7 so that a link 292 connected between the lower ends of the arms 285' and 286' may serve to cause rocking movement of the bails 285 and 286 in unison.

The restoring bails 285 and 286 are operated during an adding cycle of the mechanism by a cam 293 fixed on the cam shaft 68, while during a subtracting cycle the bails are operated by a generally similar cam 293', as will hereinafter be described. Such restoring operation is accomplished by a bell crank lever, one arm 294 of which is pinned at 295 to the downwardly extending arm 285', and the other arm 296 of which is extended to provide a cam follower 297 arranged during an adding cycle to bear against the periphery of the cam 293. A spring 298 acts between the arm 286' and the side plate 61 to maintain the cam follower 297 in engagement with the periphery of the cam. The normal rest position of the cam 293 is shown in Fig. 5 of the drawings and during the first half of a cycle of operation of the accumulator the follower 297 is maintained out of engagement with a relieved surface 300 of the cam 293, this being accomplished by a stop 301 against which one arm of the bail 285 is urged by the spring 298. After the accumulator wheels 50 have been elevated out of engagement with the teeth 278 of the carry segments and into engagement with the racks 75, a leading surface 304 on the cam 293 engages the follower 297, thereby to rock the two bails 285 and 286 in a counterclockwise direction to the positions shown in Fig. 7 of the drawings. Thus if a carry segment 275 has been displaced in a clockwise or additive direction, the cross bar 290 of the bail 286 will be effective upon the arm 281 to restore the carry segment to its normal position. If on the other hand, the carry segment has been displaced in a subtractive or counterclockwise direction, the restoring movement of the two bails is exactly the same as in an adding operation but takes place at a different time in the cycle by reason of the use of the cam 293', and in such a subtracting cycle the restoring movement is imparted to the carry segment by engagement of the cross bar 289 of the bail 285 with the arm 280. When a carry segment 275 has been thus restored, it is latched in this normal position by a notch 305 formed in a downward extension of the associated lever 255 and arranged to engage a latching tooth 306 formed on the arm 280 of the carry segment. It will be recalled that the levers 255 are urged in a clockwise direction by their springs 258, and hence such latching engagement is maintained until the associated lever 255 is rocked in a counterclockwise direction due to engagement of a wide tooth 250 with one or the other of the cam surfaces 251 or 252 of the associated pawl 242.

After the carry segments have thus been latched in their restored position in an adding cycle, the high point or dwell surface 308 of the cam 293 moves out of alignment with the cam follower 297, and the cam follower 297 drops onto or against a slightly inset dwell surface 310 on the cam 293, and as a result the two bails 285 and 286 are actuated slightly in a clockwise direction. This withdraws the two cross bars 289 and 290 slightly downwardly from the arms 280 and 281 respectively, and as a result when an associated latch 305—306 is released, the related carry segment 275 may move or rock slightly in the direction in which it is then urged so as to move the elements of the latch out of alignment. This establishes what may be termed a conditioned relationship of the carry segment wherein the carry segment is slightly displaced from its normal relation, but is never the less in such a position that when the related accumulator wheel 50 is lowered, the teeth thereof will be properly meshed with the teeth 278 of the carry segment. After an accumulator wheel has been thus meshed with a conditioned carry segment, the continued rotation of the cam 293 allows the cam follower 297 to drop off of a radial shoulder 311 toward the dwell surface 300 and hence the bails 285 and 286 assume the positions shown in Fig. 5 wherein the cross bars 289 and 290 are spaced from their respective arms 280 and 281 in an amount which will accurately limit the carryover movement of the carry segment so as to introduce but one unit in the desired direction in the associated accumulator wheel.

It has been pointed out hereinbefore that the carry segments 275 serve to introduce carry-overs into the accumulator in either an additive or a subtractive sense, and it will be apparent that the control pawls 242 and the associated latching devices 305—306 may serve to condition the carry segments for either additive or subtractive entry of carry-overs. In such conditioning of the carry segments as well as in the carry-entering operations which follow, the carry segments must be urged in the appropriate direction in order that they may be introduced into the accumulator wheels in the same direction or sense as the primary amounts were introduced in the operation in which the carry-overs arose. To this end spring means are provided in association with the carry segments and are arranged for the selective application of spring tension in two opposite directions whereby the carry segments may be rocked in either a clockwise or a counterclockwise direction, in accordance with the direction or sense in which the sensed numerical amount is being entered into the accumulator.

In providing for such selectively applied spring tension, a shaft 315 is journaled in the side plates 60 and 61, and a comb spring 316 is secured thereon intermediate the side plates. The free ends of the teeth of the comb spring 316 are respectively engaged with bifurcations 317 provided at the free ends of the respective arms 280 of the carry segments, and thus by selectively rocking the shaft 315 in opposite directions, the direction in which spring tension is applied to the carry segments 275 may be reversed. Also it will be evident that by controlling the degree or amount of the rocking motion applied to the shaft 315, the tension of the spring 316 may be varied. Such variation in the degree of spring tension is utilized in the present machine in providing for a strong tensioning action upon the carry segments 275 when the segments are to be called upon to impart carry-over movement to the accumulator wheels 50, and to provide for a relatively slight tension at other times in order to facilitate the required movements of the parts such as the restoring movements which are applied to the carry segments.

The tensioning of the spring 316 and the direction in which such tension is applied are controlled in accordance with the present invention through means which operate automatically in accordance with the type of cycle through which the machine is being operated. To this end the rock shaft 315 has an actuating plate 320 fixed on one end thereof as shown in Figs. 1 and 2, and means are provided in association with the actuating plate 320 whereby the rock shaft 315 may be rocked in opposite directions selectively in accordance with the direction in which the spring tension is to be applied, and whereby the degree of such rocking movement in either direction may be varied during the cycle of operation of the machine. Thus a rocker 321 afforded by a pair of spaced bars 322 is pivoted at one of its ends on the outer face of the side plate 60 by a pivot pin 323, and extends along the outer face of the side plate 60 so that its other end is disposed above and in spaced relation to the actuating plate 320. A transmitting link 324 is pivoted at 325 between the bars 322 at the other ends thereof so that the transmitting link 324 extends in a downward direction, and a roller 325 mounted in the lower end of the transmitting link 324 is arranged to be seated selectively in arcuate seats 326a or 326s which are provided adjacent to the opposite upper corners of the actuating plate 320. When the roller 325 is seated in the seat 326a and the rocker 321 is rocked downwardly about its pivot 323, the link 324 acts through the actuating plate 320 to rock the shaft 315 in a counterclockwise direction as viewed in Figs. 5 and 7, and when such rocking movement is imparted to the shaft 315 the comb spring 316 may be bent to the form shown in Fig. 5 wherein tension is applied to the carry segments 275 in such a direction that carry-overs may be introduced into the accumulator wheels 50 in an additive direction. The actuating plate 320 is cut away between the two seats 326a and 326s as indicated at 327 so that the transmitting link 324 may be shifted to engage the roller 325 thereon with the seat 326s, and when this has been done, a downward rocking movement of the rocker 321 will operate to rock the shaft 315 in a clockwise direction, thereby to apply tension to the comb spring 316 in a direction such that carry-overs may be introduced into the accumulator wheels 50 in a subtractive direction.

It has been pointed out hereinbefore that in the course of a cycle of operation of the machine the tensioning of the spring 316 is varied, and this is accomplished through the cooperation of cam means mounted on the accumulator cam shaft 68 in position to be engaged with a cam roller 329 mounted between the bars 322 of the rocker 321 intermediate the ends of the rocker. It will be observed that a spring 330 acting between the rocker 321 and the side plate 60 urges the rocker 321 in a downward direction, and in the normal at rest condition of the mechanism such spring tension maintains the cam roller 329 in engagement with a cam 331 which is fixed on the extended end of the shaft 68. The cam 331 is adapted to control movements of the rocker 321 during the adding cycles of the present mechanisms, and when the machine is at rest the cam 321 is positioned as shown in Fig. 1. Hence when the machine starts through an adding cycle, the comb spring 316 is under a relatively heavy tension and this condition prevails until about the time when the accumulator wheels 50 are elevated into engagement with the racks 75, and at this time an elevated dwell surface 332 on the cam 331 engages the roller 329 so as to raise the left hand end of the rocker 321. Thus the shaft 315 is allowed to rock slightly in clockwise direction from the position shown in Fig. 5 to thereby reduce the spring tension applied to the carry segments 275. While the spring tension is thus reduced the carry segments 275 are restored as hereinbefore described. In an adding cycle, after the carry segments are thus restored and the desired values have been entered into the accumulator wheels by the return movement of the set up sensing bars, the accumulator wheels 50 are lowered through the action of the cam 67, and thereupon the roller 329 rides off of the elevated dwell surface 332 of the cam 331 to thereby apply increased tension to the comb spring 316 and effect carry-over entries from those carry segments which have been conditioned or unlatched during the entry of the numerical amount by the sensing bars in the preceding portion of the machine cycle.

The cam 331 is normally maintained in its operative relation to the cam roller 329, but when a subtracting operation is to be performed, another cam 341, Fig. 4, which is also fixed on the shaft 68 is brought into cooperating relation with the roller 329 and the cam 331 is moved out of cooperating relation with the roller. This is accomplished through axial shifting movement of the shaft 68 together with the various cams mounted thereon, it being observed that the shaft 68 as herein shown is urged toward the left hand side of the machine, that is in an upward direction as viewed in Fig. 4, by spring means acting upon one end of the shaft 68. Thus as shown in Fig. 1 of the drawings, a leaf spring 342 is mounted on the side plate 60 so that the spring acts upon the right hand end of the accumulator cam shaft 68, and the spring 342 acts normally to urge the cam shaft 68 in a left hand direction to a normal position wherein the cam 67 is aligned with the cam roller 66 and the cam 331 is aligned with the same roller 329.

When the cam shaft 68 is shifted in a right hand direction so as to move the cams 230 and 341 into operative alignment with their respective cam rollers, the machine may be operated through a subtracting cycle. In such a cycle the cam 230 operates immediately to elevate the accumulator wheels 50 into meshed relation to the racks 75, and in this cycle of operation numerical amounts are introduced into the accumulator in a subtractive direction during the rearward movement of the sensing bars, and at the time when the accumulator wheels 50 are elevated, the cam 341, which is then in its operative relation to the cam roller 329, acts as soon as the rotation of the accumulator cam shaft 68 is started to raise the rocker 323. This has the effect of reducing tension upon the comb spring 316, and also serves to cause shifting movement of the transmitting link 324 to engage the roller 325 thereon with the seat 326s. Such shifting of the transmitting link 324 is effected through the medium of a slide 350 which is mounted for longitudinal sliding movement in brackets 351 and 352 carried on the outer face of the side plate 60. On its low edge the slide 350 has a downwardly extending abutment lug 355 which may be positioned selectively in the path of rollers 356s or 356a which are mounted on arms extended in opposite directions from the upper end of the transmitting link 324. Thus when the transmitting link is to be shifted from the position shown in Fig. 1 to the position shown in Fig. 2 in the course of a subtracting cycle of operation, the slide 350 is shifted from its normal position of Fig. 1 in a forward direction to the position shown in Fig. 2, thereby to locate the abutment lug 355 over the roller 356s. In such shifting movement the slide bar 350 may yield upwardly against the downward force of a spring 358, but this spring holds the abutment lug 355 firmly against the roller 356 when the forward shifting movement of the slide bar has been completed. Thus when the cam 341 elevates the rocker 321 at the beginning of the subtracting cycle, the roller 356s is pressed against the abutment lug 355 so as to cause counterclockwise rocking movement of the transmitting link 324 which moves the roller 325 thereof into the seat 326s of the actuating plate 320. In the course of this readjustment of the parts, the spring 316' tends to straighten out and return the actuating plate toward a horizonal relationship so that the shifting movement of the transmitting link 324 may be readily accomplished.

When the accumulator cam shaft 68 is shifted axially in a right hand direction at the beginning of a subtracting operation, the restoring cam 293 is moved out of alignment with respect to the cam follower 297 of the restoring mechanism of the carry segments, and the similar restoring cam 293' is moved into alignment with the cam follower 297. The cam 293' has the same form as the cam 293 but is disposed in a different rotative relation upon the accumulator cam shaft 68, this relation being such that the leading surface 304 of the cam 293' engages the cam follower 297 at the time when the accumulator wheels 50 are being elevated to engage the rack 75. This leading surface 304' therefore causes the carry segments 275 to be restored at substantially the time when the accumulator wheels become engaged with the racks 275. Thus during the first half of a subtracted cycle the carry segments may be conditioned for operation whenever a wide tooth 250 acts upon the cam surface 252 of a control pawl 242, and in the last half of the cycle, after the accumulator wheels 50 have been returned to their engaged relation with respect to the carry segments, the cross bars 289 and 290 may be lowered and the spring 316 may be additionally tensioned to effect entry of carry-overs from the condition carry segments. Such additional tensioning of the comb spring 316 takes place when the roller 329 rides off of the elevator surface 342 at the point 342' as indicated in Fig. 2 of the drawing.

In a subtracting cycle as just described the operation of the printing means takes place in substantially the same manner as hereinbefore described with respect to the adding cycle, in that the rocker 96 engages the pin 218' at the end of the clockwise rocking movement of the rocker 96, thereby to release the latching bail 216 and cause operation of the hammers 198. It will be understood, of course, that in some instances a suitable symbol might also be printed to indicate that a numerical item has been entered subtractively into the accumulator, but such means is not required in the present mechanism since this mechanism is intended and adapted for use with printed forms, and the subtractive amounts are indicated as such by the position in which they are printed on the form.

At the end of a subtracting cycle, the slide bar 350 is returned in rearward direction to the position shown in Fig. 1, this being accomplished by means which will be hereafter described in detail. Thus at the end of a subtracting cycle the machine is conditioned for the performance of an adding operation in the next cycle of operation.

In the course of operation of the machine the various amounts are accumulated on the accumulator gear wheels 50 and usually at the end of a predetermined series of operations, which may in some instance be referred to as the end of a run, it is desired to read out the total of the amounts that have been accumulated on the wheels 50 so that such a total may be printed by the related printing mechanism, and to this end one of the keys K is arranged to institute a total-taking cycle of the machine wherein the accumulator gear wheels 50 are caused to be engaged with the racks 75 in such a way that the setting of the wheels 50 can be utilized to set up associated printing means so that the total accumulated on the wheels may be printed therefrom. In this connection it will be evident that in a total-taking cycle instead of the accumulator gear wheels 50 being engaged with the racks 75 during the forward movement of the set-up bars 40, this must be done during the rearward movement of the set-up bars 40. This end is accomplished through the use of the subtracting cam 230 which is shifted into cooperating relation with the cam roller 66 when a total taking operation is to be performed.

A total taking operation is initiated by pressing down on a key lever 360, Figs. 4, 7 and 6, this key lever being loosely mounted on the shaft 127 which extends between the side plates 128 and 129. The key lever 360 has a laterally projecting lug 361 formed thereon so as to overlie a relatively large control rocker 364 which is also pivoted loosely upon the cross shaft 127. Thus when the key lever 360 is depressed, the lug 361 imparts a similar movement to the control rocker 364. The control rocker 364 has a downwardly projecting arm 365 thereon, Figs. 7 and 6, which in the downward rocking movement of the rocker 364 is engaged with the forward edge of a laterally projecting arm 366' formed on the downwardly projecting arm of a bell crank 366. The arm 365 has an upstanding cam roller 367 thereon which in the described rocking movement of the lever 366, engages a sloping cam surface 369 formed on the forward end of a control lever 370. The control lever 370 is pivoted on a vertical shaft 371, Fig. 4, and has a rearwardly projecting lever 372, which is also pivoted on the shaft 371, secured thereto by an adjustable screw device 373 so that the lever 372 moves with the lever 270.

The lever 372 is so disposed that the side edge thereof engages the left hand end of the accumulator cam shaft 68, and when the roller 365 causes rocking movement of the lever 372 in a clockwise direction as viewed in Fig. 4, the accumulator cam shaft 68 is shifted axially against the action of its spring 342 to such a position that the cams 294', 230, and 341 are aligned respectively with the cam follower 297, the cam roller 66, and the cam roller 329. When this relation has been obtained the lever 372 is latched by latch member 375 which is pivotally supported at 376 on the side plate 61. This latching action is accomplished by a notch 377 in the latch member 375 which engages a lug 378 which projects downwardly from the lever 372 near the rear end thereof.

As an incident to the depression of the total key lever 360, the clutch control solenoid 110 is energized thereby to start rotation of the cam shafts 71 and 68. This is accomplished by closure of a normally open switch 386 in the energizing circuit of the solenoid 110 and which is mounted on a bracket 387 carried on a mounting bar 388 extended from the side plate 128 to the plate 129 and somewhat beyond the plate 129 as shown in Fig. 4. A switch operating lever 390 is centrally pivoted at 391 on the forward edge of the bar 388 so that one end thereof underlies the free ends of the switch 386 while the other end thereof underlies the lever 366. Thus when the arm 365 of the total key lever 360 engages the laterally projecting arm 366' of the lever 366, the forwardly projecting arm of the lever 366 presses one end of the switch operating lever 390 downwardly so that the other end thereof moves upwardly and closes the switch 386.

It will be recalled that when the cam 230 is operative upon the cam roller 66, the accumulator wheels 50 are moved into engagement with the rack 75 at the beginning of the cycle, and as the set-up bars 40 move rearwardly, the accumulator wheels are operated in a clockwise direction, or in other words in a direction opposite to the normal adding direction. In a total taking operation it is desired to terminate such clockwise movement of each of the accumulator wheels 50 when the respective wheels reach what may be termed their zero positions, and a plurality of normal inoperative zero stop pawls 395 are provided to accomplish this purpose. In practice the zero stop pawls 395 are unitary in construction in that all of the zero stops are formed on a single member by milling of slots into the upper edge of the member. The zero stop pawls 395 are fixed upon a shaft 396 which is extended between and rotatably mounted in downwardly extended lugs 397 provided on the ends of the arms 53 and 54. An opening 397 is provided through the member which provides the stops 395 and a rod 398 extends therethrough and is mounted in the lugs 396 to limit rocking movement of the zero stop pawls. On one end of the shaft 396 a bell crank is fixed so that one arm 399 thereof extends downwardly, and a spring 400 acts on the arm 399 to maintain the zero stops 395 in normally retracted positions as shown in Fig. 5. The other arm 401 of the bell crank extends in a forward direction and is utilized in shifting the zero stops 395 to their active positions during a total taking operation.

Such actuation of the zero stops 395 is initiated when the control rocker 364 is operated, there being a rod 403 extended rearwardly, Fig. 3, from the rocker 364 to a lever 405. In the present instance the lever 405 is mounted upon a rocking bar 185 so that the rocking bar 185 provides the pivotal axis for the lever 405. At its lower end, as shown particularly in Fig. 4, the lever 405 has a cam block 406 mounted thereon. The cam block 406 is so arranged that in the upward rocking movement of the lever 405, a cam surface on the cam block acts upon the head of a pin 408 which is mounted so as to extend through the side plate 61 of the accumulator. The pin 408 is normally biased to the inactive or withdrawn position shown in Fig. 4 by a spring 409, but when the lower end of the lever 405 is rocked upwardly, the cam block forces the pin 408 inwardly beyond the inner face of the side plate 61 so that the pin 408 is located in a projecting position above the arm 401. Thus when the accumulator wheels 50 are elevated at the beginning of a total taking cycle, the arm 401 strikes the projected pin 408 so as to rock the zero stop pawls 395 to their active positions of Fig. 7. The zero stop pawls are maintained in this position at least until the first half cycle of the machine is completed, this being accomplished by latching the lever 403 in its elevated position. For this purpose a pin 410 is provided on the lever 403 in such a position that when the lever 403 is elevated, a block 411 on the lever 372 is moved into position beneath the pin 410 as the lever 372 is moved to its latched position. Since the lever 372 is maintained in its latched position until substantially the end of the machine cycle, the lever 403 is correspondingly latched and the zero stops are maintained active. During this time the clockwise movement of the rocker 96, Fig. 1, permits the various set-up bars 40 to be yieldingly moved in a rearward direction, and this rearward movement of each of the set-up bars continues until one of the side teeth 250 of its associated accumulator wheel 50 strikes the upper end of the associated zero stop pawl 395. Thus when the rocker 96 has reached the end of its clockwise stroke, all of the accumulator wheels will be in their zero positions. The cam 230 then acts to lower the accumulator wheels 50 so that they are disengaged from the racks 75 and are engaged with the teeth 278 of the carry segments 275, it being observed that at this time all of the carry segments are in their fully latched or normal positions, since no carries have arisen in the course of the return of the accumulator wheels to their zero positions.

In this last half of a total-taking cycle the rocker 96 restores the set-up bars 40 in a forward direction to their normal position, and at substantially the end of the cycle, the latch 375 is released so that the mechanism may return to its normal relation and be thereby conditioned for the next cycle of operation. Such release of the latch 375 is attained by cam means including a generally circular cam disk 415 mounted on the main cam shaft 71, this cam disk being engaged by a roller 416 mounted on one arm 417 of a bell crank which is pivoted at 418 as shown in Fig. 3. A spring 419 acting between the other arm 420 and a stationary part of the frame maintains the roller 416 against the cam 415, and the arm 420 extends upwardly to a position wherein it may engage a pin 421 which is extended down from the lower face of the latch 375. When the mechanism reaches substantially the end of a cycle, the roller 416 rides into a recess 423 in the cam 415, and when this occurs the arm 420 engages the pin 421 to release the latch 375. This frees the lever 372 so that the spring 342 acts to return the accumulator cam shaft 68 to its normal position shown in Fig. 4 of the drawings. Such unlatching of the lever 372 also unlatches the lever 403 so that the plate 182 returns to its active position and the pin 408 is withdrawn to its normal inactive position.

In certain instances it may be desirable to ascertain the subtotal of the numerical items entered into the accumulator wheels 50, and when this is desired a subtotal key lever 430 which is mounted on the extended end of the cross shaft 127 is depressed. The subtotal key lever 430 as shown in Figs. 3 and 14 is in the form of a bell crank so as to provide an upwardly extending arm 431, and this arm has a link 432 extended rearwardly therefrom. The rear end of the crank is connected by a pin and slot joint 433 to an accumulator control lever 434. The accumulator control lever 434 is pivoted at its upper end on a pivot pin 435, and at its lower end the accumulator control lever has a laterally extended arm 436 having a cam surface 437 thereon adapted to engage a roller 438 which is extended from an accumulator shaft 51 outwardly through a slot 439 in the side plate 61. The accumulator control lever 434 is normally urged toward its inactive position of Fig. 3 by a spring 440, but when the subtotal key lever 430 is depressed, the lever 434 is drawn forwardly against the action of its spring 440 so that the cam surface 437 engages the roller 438 and lifts the accumulator wheels 50 into engagement with the racks 75 of the sensing bars. The accumulator control lever 434 is latched in this position by a latch 441 which is urged to its active position by a spring 442. Thus the accumulator wheels 50 are held in their elevated positions until the latch 441 is released.

In a subtotal operation the accumulator wheels 50 are returned to their zero positions as determined by the zero stop pawls 395, and hence these pawls are rendered active when the subtotal lever 430 is depressed. To attain this action the control rocker 364 has a lug 445, Figs. 4 and 6, extended from its lower edge so as to underlie the subtotal key lever 430, and hence when the subtotal key lever 430 is depressed, the control rocker 364 is operated and accomplishes the functions hereinbefore described with relation to the total taking operation. These functions include the operation of the pin 389 upon the arms 125 and 126 to lower the block 121 to the inactive position of Fig. 7. The control rocker 364 also acts upon the lever 366 which operates the switch actuating lever 390 to thereby trip the clutch 105, and the roller 367 operates the levers 370—372 to their latched positions wherein the accumulator cam shaft is shifted so as to locate the cams 293', 230' and 341 in the positions which they occupy in a total taking operation.

When the respective accumulator wheels 50 have been returned to zero, the accumulator wheels are maintained in engagement with the racks 75 during the return or forward movement of the set-up bars 40. This is accomplished by the accumulator control lever 434 which is maintained in its active position by the latch 441, even though the subtotal key lever 430 is released. When the restoring movement of the set-up bars 40 have been completed the accumulator control lever 434 is released under the control of the cam 415 by utilizing the motion which is imparted to the latch 375 to impart releasing movement to the latch 441. Thus as shown in Figs. 3 and 4, the latch 375 has an upstanding ear 450 thereon in such a position that when the latch 375 is released the ear 450 engages the end of an adjustable screw 451 carried on a downwardly projecting arm 452 of the latch 441. Hence the accumulator control arm 434 is unlatched at the end of the cycle and is withdrawn by its spring 440, and the accumulators which have been returned to their previously set positions are moved downwardly out of engagement with respect to the racks 75. Thus the machine is in condition for the next accumulating or other operation thereof.

When a subtracting operation is to be performed, a subtraction key lever 460 is depressed, the lever 460, Figs. 4 and 6, being loosely mounted on the cross shaft 127. An ear 461 is formed on the subtraction key lever 460 so as to extend over the lever 366 in position to control switch 386. Moreover, in the actuation of the subtracting key lever 460, the roller 367 acts upon the lever 370 to shift the lever 372 to its latched position. This shifts the accumulator cam shaft 68 so that the cams 293', 230 and 341 assume their active positions, with the result that the cam 293' operates the restoring mechanism of the carry segments, the cam 230 shifts the accumulator wheels 50 and the cam 341 operates the carry-control rocker 321 in the proper timed relation to accomplish the entry of carry-overs in the subtraction operation. The shifting of the lever 372 to its latched position also serves to shift the slide bar 359 to the forward position shown in Fig. 2 of the drawings, and this is accomplished by a laterally extending lever arm 465, Fig. 4, which is operatively connected to the lever 372 in an adjustable manner by a screw device 466. The lever arm 465 has a rounded head 467 at the end thereof and this head is located in a slot 468 formed in the upper edge of the slide bar 359. Hence the slide bar 359 is shifted forwardly at the beginning of a subtracting operation, and is returned to its rearward position when the latch 375 is released at the end of the cycle of operation. Hence when the latch 375 has been released, the parts of the machine are in their normal positions and the machine is conditioned for the next cycle of operation.

The adding cycle of operation of the machine, which has hereinbefore been described in detail, is in the present instance initiated merely through energization of the clutch control solenoid 110 for it will be observed that in its present form the elements of the machine at the end of each cycle assume relationships adapted for the performance of an adding cycle. Hence when an adding cycle is to be performed, an adding key lever 480 is actuated which is loosely mounted on the cross shaft 127 in such a position that depression thereof will engage the switch 286 to close the same, and when this is done the machine operates through the adding cycle which has been hereinbefore described in detail.

In the use of the accumulator of this invention, where it is embodied in a machine having card controlled or like set-up mechanism the operation will provide for the accumulation of a relatively large positive total and for the subsequent subtraction of one or more smaller numerical amounts to produce a positive total. By reason of this manner of use of the machine it is unnecessary to afford a "fugitive 1" mechanism. When the set-up means have been set, the operator may initiate a cycle of the machine, this being done through depression of the key lever 480. In such cycle the main clutch 105 of the machine is engaged so as to drive the main shaft 71 and the cam shaft 92 through a one-revolution cycle of operation.

Figure 9:
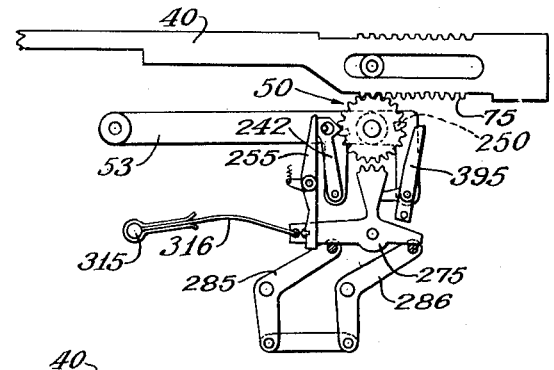

The set-up members 40 are in such a cycle moved through their set-up movement, and as indicated in Fig. 18 this is initiated soon after the cycle is started, the rocker 96 and the roller 95 being moved rearwardly to allow set-up members to be yieldingly urged in a rearward or sensing direction. Such yielding actuation of the set-up members 40 is accomplished by the springs 116 and 116' which in the present instance act upon the gear segments 113. The yieldingly induced set-up movement of the set-up members 40 may continue until the respective members 40 encounter set-up means with which they are associated, and in the adding operation which is now in progress, such set-up movement takes place while the accumulator pinions 50 are in their lower positions of Fig. 5, thereby rendering such set-up movement independent of the accumulator wheels 50. As illustrated in Fig. 9 of the drawings, the set-up member 40 has moved rearwardly and into cooperation with a position representative of the digit "9."

During such rearward movement of the set-up bars 40, the roller 66 on the accumulator frame 53 is engaged with a dwell portion of the cam 67 so that the accumulator wheels 50 are maintained in their lower positon. Early in the second half of the machine cycle, that is, after the completion of the rearward movement of the set-up bars 40, the roller 66 is engaged by a leading portion on the cam 67 which results in elevation of the frame 53 and the accumulator wheels 50 into an elevated position such as that shown in Fig. 9 wherein the teeth of the pinions 59 are engaged with the rack teeth 75 so that entries may be made into the accumulator wheels during the forward or return movement of the set-up bars 40. Since it may be assumed that the accumulator was cleared in the preceding machine cycle, the wide teeth 250 which constitute the index elements on the left hand edge of the pinions 50 as shown in Fig. 9 are at this time engaged with the lower cam surfaces 251 of the transfer or carry pawls 242 of the carry over mechanism, as shown in Fig. 9, and during the forward or restoring strokes of the set-up bars, the accumulator wheels 50 are rotated in a counterclockwise direction to thereby introduce the set-up numerical amounts into the accumulator in an additive direction. Thus, a comparison of Figs. 9 and 10 will show that during the return stroke of the set-up bar 40 there shown, the index element 250 of the associated accumulator wheel 50 has been moved nine spaces in a counterclockwise or adding direction, thereby indicating the additive entry of "9" into the associated accumulator wheel 50.

It should also be observed that while the set-up bars dwell in their rearward or amount indicating positions, an associated printing mechanism may be operated to print the represented numerical amount.

Figure 10:
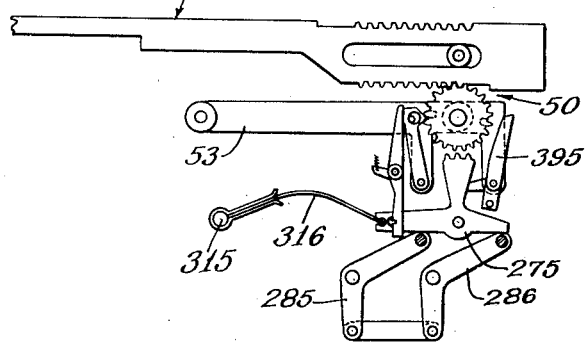

In the restoring movement of a set-up bar 40, such as that indicated in Figs. 9 and 10, the rotation of the associated accumulator wheel 50 in a counterclockwise direction from its zero position of Fig. 9 to its "9" position of Fig. 10, moves the other one of the index elements 250 into engagement with the upwardly facing cam surface 252 of the transfer pawl 242. It will thus be seen that when another operation of the accumulator wheel 50 takes place in an additive direction the first movement of the accumulator wheel will actuate the pawl 242, as will be hereinafter described. During the entry of "9" as above described with reference to Figs. 9 and 10, there is no operation of the associated carry over mechanism so that the accumulator wheel 50 remains in the "9" position of Fig. 10 until the end of this cycle. After the return movement of the set-up bars 40 has been completed, at the time indicated in Fig. 18, the elevated dwell portion of the cam 67 rides out of alignment with the roller 66 of the accumulator frame and hence the accumulator frame 53 is lowered and the accumulator wheel 50 is moved from the position shown in Fig. 10 to the position shown in Fig. 11, and in this later position the accumulator wheel is engaged with the teeth 278 of the related carry over member 275.

In order to further illustrate the operation of the accumulator mechanism and the carry over mechanism thereof, it will be assumed that in the next machine operation the set-up mechanism will be set to add "4" in the order which corresponds to the order to which the set-up member 40 of Fig. 10 is allocated. The operator will therefore initiate the next cycle of operation by depression of the key lever 480. The associated set-up bar 40 will then be moved yieldingly in a rearward or set-up direction from its normal or restored position to the position shown in Fig. 11 of the drawings, and such movement will be terminated by the associated set-up or control means.

At the completion of this set-up movement the set-up bar 40 will be located in a position which is also representative of "4." The cam 67 then acts upon the accumulator frame 53 to engage the accumulator wheels 50 with the racks 75, and at about this time the carry over spring 316 will have its tension reduced so that the carry mechanism will be in condition for actuation of the carry pawls 242. Such reduction of the tension upon the carry over spring 316 is caused by the engagement of the elevated dwell portion 332 of the cam 331 with the roller 329 of the tension varying mechanism. The elevated dwell of the cam 331 causes the frame 321 to be rocked upwardly, thereby raising the link 324, Fig. 1, and allowing the spring carrier shaft 315 to rock slightly in a clockwise direction, to thereby reduce the tension on the spring 316.

At about this time, as indicated in Fig. 18, in the event that any of the carry-over members 275 have been actuated from their normal positions, the requisite restoring movement is applied thereto. At this time the carry spring 316 is relatively lightly tensioned, as hereinbefore described, so that the rocking movement of the two restoring bails 285 and 286 may be readily accomplished. In such restoring movement the two restoring bails 285 and 286 move in unison so that the cross members thereof approach the carry members 275 on opposite sides of the rocking axis of the carry members, and hence one of the bails will inevitably engage the opposed one of the transverse arms of any carry over member which has been actuated from its normal position. This will return the carry over member to the normal position shown in Fig. 9 so that the latch member 255 may become engaged with the carry over member to hold the same in its normal position. Soon after such restoring movement of the carry segments has been completed, the cross members of the two bails 285 and 286 are retracted slightly from the projecting arms of the carry over members 275 so that such carry over members may, when unlatched, move slightly out of their normal positions for a distance sufficient to insure continued disengagement of any latch which has been thus released. This position of the restoring bails 285 and 286 is illustrated in Fig. 10 of the drawings.

Figure 11:
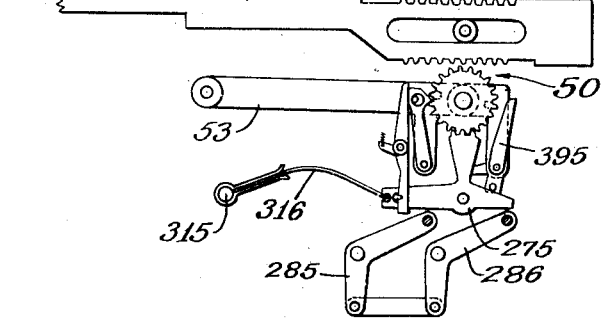
Figure 12:
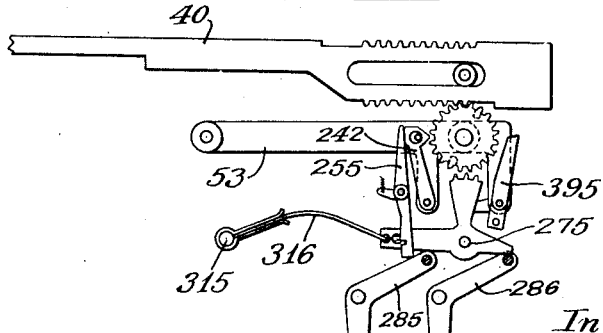
Figure 13:
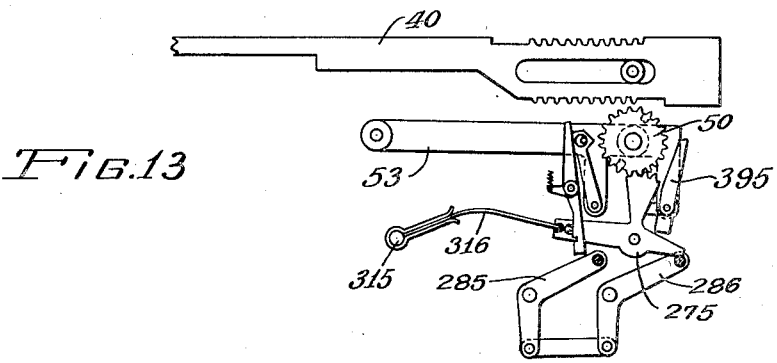

After the carry segments 275 have been restored as aforesaid, the set-up bars 40 start upon their restoring or forward movement, this action taking place at the time indicated in Fig. 18. In the course of such restoring movement, the associated accumulator wheels 50 are operated in an adding direction in amounts corresponding to the set up positions of the set-up bars. Thus when a set-up bar has been set up to indicate the numeral "4," as shown in Fig. 11, an accumulator wheel 50 which has been previously set to indicate "9" will be actuated in a counterclockwise or additive direction to the position indicated in Fig. 12. In the course of such counterclockwise movement the index element 250 which has been initially located in abutment with the cam surface 252 of the carry pawl 242 will act upon this cam surface to rock the associated carry pawl 242 to its released position of Fig. 12. Such an actuation of the pawl 242 acts upon the latch member 255 to release the latch, and the associated carry over member 275 is thereby released for rocking movement. Such rocking movement in an adding operation of the machine is in a clockwise direction since at this time in such an adding cycle the spring 317 is lightly tensioned in the direction indicated in Fig. 12. The spring 317 will therefore rock the released carry over member 275 slightly in a clockwise direction until the arm 281 engages the cross member of the bail 286. This movement is relatively slight and is such that the teeth 278 of the released carry over member 275 remain in substantial alignment with the appropriate teeth of the associated accumulator wheel 50, and it should be noted that the carry over member 275 which has thus been released is the one which is adapted for engagement by the accumulator wheel 50 in the next higher order of the accumulator.

After the restoring movement of the set-up bars 40 has been completed, the cam 67 causes the accumulator wheels to be moved downwardly and out of engagement with the racks 75, and at the same time the accumulator pinions are engaged with the carry segments 275. At about this same time the elevated dwell portion 332 of the cam 331 rides out of alignment with the roller 329 so that the tension varying frame 321 is rocked downwardly by its relatively strong spring 330. This imparts a relatively heavy tension to the carry over spring 316 and such tension is in this cycle of the machine applied in the direction indicated in Fig. 12 and 13 so as to urge the carry over members 275 in a clockwise or adding direction. After the engagement of the accumulator wheels with the carry over segments 275, the restoring bails 285 and 286 are rocked an additional distance in a clockwise direction to the positions shown in Fig. 13, thereby to permit carry over movement of those carry over members 275 which have previously been unlatched. This movement is accurately limited by the cam 283 to an amount which is just sufficient to cause entry of one digit into the accumulator wheels associated with the released carry over members. It may happen, of course, that the introduction of a carry over into one order of the accumulator in the manner just described will advance the accumulator wheel 50 of that order into its zero position, thereby to trip the pawl 242 and the latch 255 of the next higher order. Such a condition would arise, for example, in the event that the figure "4" were entered additively into the accumulator when the amount standing therein in "90,999." In such an instance, the entry of the "4" in the units order would cause a carry over to be entered in the tens order in the manner hereinabove described, with the result that the accumulator wheel 50 of the tens order would pass from "9" to "0" and hence the pawl 242 of the hundreds order would be actuated so as to release the latch 255 of the thousands order of the accumulator. This would, of course, take place at a time when the restoring bails 285 and 286 were in their fully retracted positions of Figs. 5 and 19, and hence the carry segment 275 of the thousands order would immediately move through its full range of movement in an adding direction, thereby to enter "1" in the thousands order. Thus, a carry on a carry is effected; and in the cited example, this would move the accumulator wheel 50 of the thousands order from "9" to "0" and would cause a carry to be entered in the hundred thousands order, with the result that the total in the accumulator will stand at 91,003. The carry over members 275 which have thus been actuated remain in their actuated positions until such time as the accumulator wheels 50 are to be again engaged with the racks 75 and hence the accumulator wheels are maintained accurately in the positions to which they have been actuated.

Thus the adding cycle of the machine has been described, and a typical subtracting cycle of the machine, including an operation of the carry over mechanism in a subtracting direction, will now be described in detail. It will also be assumed that the digit "4" is set-up on the associated set-up means to control the set-up element 40 shown in Fig. 14. The operator than initiates the next cycle of operation of the machine by depression of the key lever 460, and this lever is effective not only to initiate the cycle but also to condition the mechanism so that the desired numerical amount will be entered into the accumulator in a subtractive direction. Thus the lug 461 on the key lever 460 engages and actuates the rocking lever 366 and in its rocking movement, the roller 366′ engages the cam surface 369 on the lever 370 to rock the lever 370 in a clockwise direction about its pivot 371 as viewed in Fig. 4. The lever 372 is connected to the lever 370 so that the lever 372 is moved to such a relation that it is engaged by the latch 375. In such movement the lever 372 engages the adjacent end of the accumulator cam shaft 36 so as to actuate this shaft against the force of the spring 342. Such movement of the cam shaft 68 changes the relationship of the various controlling cams so that the cams which are to function in a subtracting operation are moved into their operative positions. Thus the cam 293′, Fig. 4, is moved into alignment with the nose 297 of the lever 296, this lever being connected to the restoring mechanism of the carry segments. Similarly the cam 230 is moved into alignment with the cam roller 66 of the accumulator supporting frame 53, while the cam 341 is moved into alignment with the cam roller 329 of the spring tensioning frame 321. The shifting movement of the lever 372 also serves to shift the slide bar 350 in a forward direction, as will be evident in Fig. 4 of the drawings, and such movement positions the abutment lug 355 of the slide bar 350 in a position over the roller 356s and because the arm 365 is rigidly secured to the lever 372, the latch 375 serves to hold the slide bar 350 in its forward position until substantially the end of the machine cycle.

The foregoing conditioning movements which are imparted to the various elements of the mechanism occur as an incident to the depression of the key lever 460 which also operates through the cross lever 390 to close the control switch 386. Such closure of the switch 386 causes the clutch 105 to be engaged so as to drive the various shafts of the machine through their one-revolution cycles of operation. Soon after the cycle of operation is thus instituted, the cam 230 acts upon the roller 66 to elevate the accumulator frame 53, thus to engage the accumulator wheels 50 with the racks 75 as shown in Fig. 14 of the drawings, and the time in the cycle at which this occurs is indicated on the timing chart which constitutes Fig. 17 of the drawings. At about this same time, as indicated in Fig. 17, the cam 341 acts upon the roller 329 to elevate the spring tensioning frame 321, thereby to reduce the tension of the carry-over spring 316, and since the lug 355 of the slide bar 350 is disposed over the roller 356s, the raising of the tension varying frame 321 causes the link 324 to be rocked in a counterclockwise direction from the position of Fig. 1 to the position of Fig. 2. This causes the roller 325 to be seated in the recess 326s, thereby to apply tension to the spring 316 in subtractive direction. After the tension of the spring 316 has been reduced and reversed in this manner, the cam 293' acts upon the restoring mechanism so as to shift the restoring bails 285 and 286 to the positions shown in Fig. 14. This returns all of the carry segments 275 to their normal positions so that the latch mechanism 305—306 may become effective thereon.

When the foregoing operations have been completed, the set-up bars 40 start rearwardly, at the time indicated in Fig. 17. Where the set-up bar 40 is to enter an amount representative of "4," as shown in Figs. 14 and 15, the set-up movement of the set-up bar will continue until it has moved in an amount representative of the digit "4." In the example illustrated in Figs. 14 and 15, the accumulator wheel stands at a position representative of "3" at the beginning of the cycle, as shown in Fig. 14, and as the set-up movement of the set-up bar 40 progresses, the accumulator wheel 50 is actuated in a clockwise or subtractive direction to the position shown in Fig. 15. It will be evident that as the clockwise movement of the accumulator wheel 50 progresses, the wide tooth or index element 250 will move into engagement with the cam surface 251 of the carry over pawl 242, thereby to actuate the latch member 255 to the position shown in Fig. 15. This serves to unlatch or condition the carry over member 275 which is associated with the accumulator pinion 50 of the next higher order, it being observed that during the time when the accumulator wheels are being actuated, the restoring bales 285 and 286 are slightly retracted from the projecting arms of the carry over members, thereby to permit slight movement of the carry over members when they are unlatched. Since the spring tensioning means has, by virtue of the shifting of the slide bar 359, rocked the shaft 315 in a clockwise direction, the carry over spring 316 is at this time lightly tensioned in the direction shown in Fig. 15 of the drawings, and when a carry over member 275 is unlatched or conditioned as aforesaid, it is rocked slightly in a counterclockwise direction to the position shown in Fig. 15 of the drawings. The movement of the set-up bars 40 in a rearward direction is completed in the first half of the machine cycle, as indicated in Fig. 17, and early in the second half of the cycle, the cam 239 operates to lower the accumulator frame 53 so as to engage the accumulator wheels 50 with the carry over members 275.

The return or restoring movement of the set-up bars 40 is then started.

It will be recalled that the illustrated example shown in Figs. 14 to 16 has resulted in the unlatching or conditioning of at least one of the carry-over members 275 so as to move the same into the conditioned position of Fig. 15. The conditioned carry-over member 275 is retained in this position until the accumulator wheels 50 have been lowered to engage the carry segments, and as shown in Fig. 17 of the drawings, the conditioned carry-over members 275 are operated through their entry effecting movements soon after the return or restoring movement of the bars is started. At this time the spring tensioning mechanism will have operated to drop the cam roller 329 off of the elevated surface of the cam 241 and as a result the spring 316 will be tensioned relatively heavily. Hence when the two restoring bails 385 and 386 are lowered, by reason of the sudden drop 311 on the cam 293', the spring 316 will act to shift the conditioned carry-over members 275 in a counterclockwise direction to the position shown in Fig. 2.

Thus by the time the return movement of the bars 40 has been completed, the subtracting operation including the entry of subtractive carry-over amounts will have been completed. Near the end of the operating cycle of the machine, the roller 416, Fig. 3 passes into the recess 423 of the cam 415, thereby to release the latch 375. The lever 372 is thus free to return to its position of Fig. 4 and the spring 342 returns the accumulator cam shaft 68 to its normal position, thereby to condition the mechanism for the performance of an adding operation in the next cycle of the machine. Hence the machine will operate through such an adding cycle unless the subtracting key lever 460, the subtotal key lever 430 or the total key lever 360 is utilized to initiate the next cycle.

The present machine may, of course, be operated to withdraw totals or subtotals from the accumulator, and the timing of the elements of the mechanism in such subtotal and total cycles is shown respectively in Figs. 19 and 20. Assuming that a subtotal should be withdrawn from the accumulator in the next cycle of operation, such cycle is initiated by depression of the subtotal key lever 430. Such actuation of the key lever 430 serves to rock the latch 519 to its latched relation, and key lever 430 also operates through the link 432, Fig. 6, to move the lever 434 in a forward direction. The cam surface 437 on this lever engages the roller 438 on the extended end of the accumulator shaft 51, thereby to elevate the accumulator wheels 50 into engagement with the racks 75 of the sensing bars 40, and the latch 441 engages the lever 434 to hold the accumulator shaft 51 in its elevated position until the latch 441 is released. It will also be observed that the key lever 430 acts upon the lug 445 of the lever 364 so as to rock this lever 364, and this movement acts through the link 403 to rock the lever 405 in an upward direction. Such movement of the lever 405 causes the cam surface 406 to project the pin 408 into the path of the arm 401 of the zero stop pawls 395. This occurs prior to the time when the upward movement of the accumulator wheels is started and hence when the accumulator wheels are elevated, the pin 408 acts as a stop in the path of the arm 401 with the result that the zero stop pawls 395 are rocked into their active positions.

The rocking movement of the arm 364 serves, through the pin 380, to impart similar rocking movement to the lever 366, and the lever 366 will act through the levers 370 and 372 causing shifting movement of the cam shaft 68. Such shifting movement of the cam shaft 68, however, is immaterial in a subtotal cycle and occurs in the present instance merely by reason of the structural arrangement of the mechanism.

After the foregoing conditioning operations have taken place, the closure of the clutch 105 causes the main cam shaft 71 to operate, and this causes the bail 96 to move in a rearward direction. Hence the several bars 40 move yieldingly in a rearward direction, and each set-up bar 40 will move until an index element 250 of the associated accumulator wheel 50 engages the related zero stop 395. When the rearward movement of the bail 96 has been completed, all of the set-up bars 40 are set to positions representative of the numerical amounts which have been withdrawn from the related wheels of the accumulator.

While the set-up bars 40 are thus located in positions representative of the withdrawn subtotal, the amount of such subtotal may be printed by the associated printing mechanism and the bail 96 then starts the return movement of the set-up bars 40, and it will be recalled that the arm 434 is at this time in its active position so that the accumulator wheels 50 are maintained in engagement with the racks 75 of the set-up bars. Hence, when the restoring movement of the set-up bars has been completed, at the time indicated in Fig. 19, all of the accumulator wheels 50 will have been returned to the positions which they occupied at the beginning of the cycle, and therefore the accumulator will be set to indicate the same total. At substantially the end of the cycle, as indicated in Fig. 19, the cam recess 423 moves into alignment with the cam roller 416, and the arm 420 is thereby caused to move to the left in Fig. 3 so as to release the latch 441. This releases the arm 434 so that it may return to its inactive position of Fig. 3, and as a result the accumulator wheels 50 are permitted to return in a downward direction into engagement with the carry-over segments 275. The operation of the lever 420 also releases the latch 375 so that the lever 370 may move in a counterclockwise direction to release the latch mechanism 515, and this permits the latch lever 510 to return to its normal position.

When the operator wishes to withdraw a total from the accumulator in such a manner as to clear the accumulator, the appropriate machine cycle is instituted by depression of the total key lever 360. Such depression of the key lever 360 operates the rocker 366 so that the roller 367 of this rocker operates to shift the lever 370 in a clockwise direction. This movement of the lever 370 continues until the latch 375 is engaged, and the accumulator cam shaft 68 is thereby shifted in a right hand direction so as to render the cams 283', 230 and 341 active upon the related cam rollers. These are the same cams which operate in a subtracting operation, and it will be recalled that in such a cycle of operation the accumulator wheels 50 are engaged with the set-up bars 40 during the rearward movement of these bars and are disengaged from the set-up bars during the forward or return stroke thereof. When the rocker 364 is shifted by the operation of the total key lever 360, the arm 405 is moved to its elevated position so as to project the stop pin 408 into its active position. Hence when the accumulator frame 53 is elevated, the pin 408 engages the arm 401 so as to shift the zero stop pawls 395 into their active positions.

After the machine has been thus conditioned, the operation of the main cam shaft 71 causes the rocker 96 to be retracted in a rearward direction, thereby to cause rearward movement of the set-up bars 40. Such rearward movement continues until an index element 250 of each accumulator wheel 50 has engaged with the related zero stop pawl 395. The operation of the cam 230 then causes the accumulator wheels to be returned in a downward direction into engagement with the carry segments 275, and at the time the accumulator wheels are thus lowered, all of the accumulator wheels 50 are set in their zero positions. At this time a printed impression of the total may be made in a conventional manner. The movement of the rocker 96 is then reversed so as to move the set-up bars 40 through idle return movements in a forward or restoring direction. At about the time when the rotative movement of the main shaft 71 is completed, the cam 415 causes the arm 420 to rock in a left hand direction in Fig. 3 and this releases the latch 375.

The release of this latch causes the lever 370 to move in a counterclockwise direction, thereby permitting the accumulator cam shaft 68 to return to its normal position. The machine is then in condition for the accumulation of further numerical amounts in the accumulator 50 in the same manner as hereinbefore described.

From the foregoing description it will be evident that the present invention enables the construction and arrangement of accumulators to be materially simplified, and that the invention enables the carry-over mechanism to be actuated by a single spring means in a new and advantageous manner. Under the present invention the spring means for the carry-over mechanism may not only be tensioned selectively in opposite directions but may also be varied as to the degree of its tension in the course of a machine cycle, thereby to simplify the construction and operation of the associated mechanism.

Hence, while I have illustrated and described the preferred embodiment of my invention, it is to be understood that it is capable of variation and modification and I therefore do not wish to be limited to the precise details set forth, but desire to avail myself of such changes and alterations as fall within the purview of the following claims.

I claim:

1. In a calculating machine, an accumulator into which numerical amounts may be entered in either an adding or subtracting direction and including a plurality of rotatable accumulator pinions each allocated to a different numerical order and each embodying at least one index element, selective control means operable to select and determine the direction of entry of numerical amounts into said accumulator, and carry-over mechanism embodying carry-over members allocated to the respective pinions and shiftable in either direction from normal positions for selective entry of carry-over amounts into said accumulator, restoring means operable through a restoring operation to return said carry-over members to said normal positions after such members have been shifted from said normal positions, normally effective individual latch means respectively associated with the carry-over members to maintain the same in said normal positions, control pawls allocated and related to the respective pinions for actuation by the index elements of the related pinions in either direction of rotation of the pinions and each operatively associated with the latch means of the next higher order of the accumulator to release the associated latch means when actuated by an index element of the associated pinion, a shiftable spring carrier, spring means mounted on said carrier and comprising a comb spring having the teeth thereof acting individually on said carry-over members to apply tension to said carry-over members in opposite directions selectively in accordance with the position of said carrier, tension-varying means operable to bend said comb spring in different amounts to thereby vary the degree of tension of said spring means to afford relatively heavy tension in said spring means when a carry-over operation is to be effected and to reduce the tension of said spring means when said restoring means is to be operated, and means governed by said control means and operated by said tension-varying means to shift said spring carrier to different positions to thereby tension said spring selectively in one direction or the other in accordance with the selective operation of said control means.

2. In a calculating machine, an accumulator into which numerical amounts may be entered in either an adding or substracting direction and including a plurality of rotatable accumulator pinions each allocated to a different numerical order and each embodying at least one index element, control means operable to determine the direction of entry of numerical amounts into said accumulator, and carry-over mechanism embodying control pawls allocated to the respective pinions and adapted for actuation by the index elements of the related pinions in either direction of rotation of the pinions, carry-over members shiftable in either direction from normal positions for selective entry of carry-over amounts in either direction into said accumulator, means for governing movement of said carry-over members in either direction from said normal positions and for restoring said carry-over members to said normal positions, normally effective individual latch means respectively associated with the carry-over members to maintain the same in said normal positions and respectively associated with the control pawl of the next lower order of the accumulator for release by the associated pawl when such pawl is actuated, spring means operable to apply spring tension to said carry-over members to urge the same selectively in either direction, said restoring means being arranged in a restoring operation to act against the resilient force of said spring means to return said carry-over members to their normal positions, spring-tensioning means controlled by said control means and operable to govern the direction in which tension is applied to said carry-over members by said spring means to coordinate the entry of carry-over amounts with the direction of entry of the numerical amounts, said spring tensioning means being operable to apply relatively heavy tension to said spring means when said carry-over members are being operated through a carry-over entering movement and to apply a relatively light tension to said spring means when said carry-over members are being restored to their normal positions.

3. In a calculating machine, an accumulator including a plurality of rotatable accumulator pinions each allocated to a different numerical order and each embodying at least one index element and said pinions being rotatable in opposite directions for adding and subtracting entries of numerical amounts, selective control means operable to determine the direction of entry of numerical amounts into said accumulator, and carry-over mechanism embodying control pawls allocated to the respective pinions and adapted for actuation by the index elements of the related pinions in either direction of rotation of the pinions, carry-over members shiftable in either direction from normal positions for selective entry of carry-over amounts in either direction into said accumulator, means for governing movement of said carry-over members in either direction from said normal positions and for restoring said carry-over members to said normal positions, normally effective individual latch means respectively associated with the carry-over members to maintain the same in said normal positions, means associating each latch means with the control pawl of the next lower order of the accumulator for release by the associated pawl when such pawl is actuated, spring means operable to apply spring tension to said carry-over members to urge the same in either direction, said restoring means being arranged in a restoring operation to act against the resilient force of said spring means to return said carry-over members to their normal positions, spring-tensioning means controlled by said selective control means and operable to govern the direction in which tension is applied to said carry-over members by said spring means to coordinate the entry of carry-over amounts with the direction of entry of the numerical amounts, means forming a part of said spring tensioning means operable to apply relatively heavy tension to said spring means when said carry-over members are being operated through a carry-over entering movement and to apply a relatively light tension to said spring means when said carry-over members are being restored to their normal positions, and means governed by said selective control means for coordinating the periods of such light and heavy spring tension with the entry of carry-overs by said carry-over members.

4. In a calculating machine, an accumulator into which numerical amounts may be entered selectively in either an adding or subtracting direction and including carry-over mechanism including carry-over members operable to enter carry-over amounts in either an adding or subtracting direction, selective control means for selectively determining the direction of entry of numerical amounts into said accumulator, said carry-over means including a rockable spring carrier, a comb spring mounted on said carrier and having its teeth extending generally radially from said carrier and engaged individually at their ends with the respective carry-over members, an actuating plate fixed on said rockable spring carrier and having actuating abutments formed thereon on opposite sides of the rocking axis, a rocking frame having one end thereof movable toward and away from said actuating plate, an actuating link pivoted on said end of said rocking frame and having its free end adapted for selective engagement with said actuating abutments of said actuating plate, means for imparting rocking movement to said rocking frame to thereby move said actuating link and apply spring tensioning rocking movement to said carrier, and means controlled by said selective control means for selectively engaging said actuating link with one or the other of said abutments to thereby govern the direction in which said spring is tensioned by said rocking frame.

5. In a calculating machine, an accumulator having a plurality of pinions each having at least one index element and capable of addition and subtracting and of accumulating positive totals, means or rotating said pinions in one direction in addition and in the opposite direction in subtracting and in total making, a shiftable frame upon which said accumulator pinions are shiftable selectively between a carry-over position in which carry-over entries are effected and a second position in which numerical amounts are entered in addition or subtraction and in which the pinions are returned to zero positions in total taking, carry-over means, including transfer pawls adapted for actuation by said index elements in either direction of rotation of said pinions, normally inactive zero-stop pawls shiftably mounted on said frame and adapted to be shifted to active positions to cooperate with said index elements to limit rotation of said pinions in total taking, an arm associated with said zero-stop pawls and extending in a direction substantially at right angles to the path of shifting movement of said frame, and total-taking control means for conditioning portions of the machine for taking a total from said pinions and including a normally inactive stop member shiftable by said total-taking control means to an active position in the path of said arm whereby as an incident to the shifting movement of said frame to said second position said zero-stop pawls are shifted to their active positions.

6. In a calculating machine, an accumulator having a plurality of rotatable accumulator pinions each allocated to a different numerical order, a plurality of entry racks each allocated to a different numerical order and shiftable through variantly controlled reciprocating strokes the lengths of which are representative of numerical amounts to be entered in the respective orders of said accumulator, a plurality of carry-over members each allocated to a different numerical order of the accumulator and adapted to be shifted in one direction from a normal position to introduce carry-over amounts into said accumulator in an adding direction and to be shifted in the opposite direction from said normal position to enter carry-over amounts into said accumulator in a subtracting direction, normally operative latch means for each of said carry-over members operable to maintain said carry-over members against movement in either direction from said normal positions thereof, cooperating means acting between each latch means and the pinion of the next lower order for releasing the associated latch means, control means operable upon said carry-over members to limit movement thereof in either direction to a relatively small amount when said carry-over members are initially unlatched and thereafter to control movement of the unlatched carry-over members through a carry-over entering movement, spring means operable to apply spring tension to said carry-over members selectively in opposite directions to thereby determine the direction of movement thereof from said normal positions, said restoring means being arranged in a restoring operation to act against the resilient force of said spring means to return said carry-over members to their normal positions, tensioning control means for said spring tensioning means and including a first means operable to apply relatively great tension to said spring means in certain portions of the cycle of operation of the machine and to apply a relatively light tension thereto at other times, and also including a second means settable to different positions to govern the direction of such spring tension, control means operable to engage said accumulator pinions with said entry racks in different portions of the reciprocating strokes to enter the represented numerical amounts selectively in either an additive or a subtractive sense, said last mentioned means being operable to engage said accumulator pinions with said carry-over members during periods when said accumulator pinions are disengaged from said entry racks, and governing means for said control means for causing same machine to operate through an adding cycle or a subtracting cycle selectively with co-ordinated entry of carry-over amounts into said accumulator, and including means operable to set said second means in one position for an adding cycle and in a different position for a subtracting cycle.

7. In a calculating machine, having an accumulator into which numerical amounts may be entered in either an adding or subtracting direction and including a plurality of rotatable accumulator pinions each allocated to a different numerical order and each embodying at least one index element, entry effecting means for entering such numerical amounts into said accumulator and for withdrawing totals therefrom, and selective cycle control means governing the cooperative action of said accumulator and said entry-effecting means and operable selectively to initiate adding, subtracting or total-taking cycles of operation thereof, the combination of a plurality of rockable carry-over members each allocated to a different numerical order in the accumulator and adapted to be rocked selectively in opposite directions from a normal position to introduce carry-over amounts into said accumulator selectively in an adding or subtracting direction, each of said carry-over members having a pair of arms extending in opposite directions from the rocking axis thereof, normally operative latch means for each of said carry-over members operable to maintain said carry-over members against movement in either direction from said normal position thereof, cooperating means acting between each latch means and the pinion of the next lower order for releasing the associated latch means, restoring means for said carry-over members comprising a pair of bails adapted respectively for engagement with the arms on opposite sides of said carry-over members and associated for conjoint movement, means for controlling movement of said bails including a pair of cams adapted for selective operation in additive and subtractive operations of the machine to limit movement of said bails and said carry-over members to a relatively small amount when said carry-over members are initially unlatched and thereafter to control movement of the unlatched carry-over members through a carry-over entering movement, spring means operable to apply spring tension to said carry-over members selectively in opposite directions to thereby determine the direction of movement thereof from said normal positions, and means included in said selective cycle control means operable to render said cams effective selectively in accordance with the type of cycle selected by said cycle control means.

WALTER T. GOLLWITZER.

REFERENCES CITED

The following references are of record in the file of this patent:

UNITED STATES PATENTS

| Number | Name | Date |
|---|---|---|
| 1,005,397 | Wolter | Oct. 10, 1911 |
| 1,178,806 | Howieson | Apr. 11, 1916 |
| 1,594,371 | Lasker | Aug. 3, 1926 |
| 1,775,223 | Foothorap | Sept. 9, 1930 |
| 1,810,213 | Johantgen | June 16, 1931 |
| 1,826,291 | Strother | Oct. 6, 1931 |
| 1,853,053 | Horton | Apr. 12, 1932 |
| 1,867,002 | Gardner | July 12, 1932 |
| 2,014,561 | Dysart | Sept. 17, 1935 |
| 2,052,905 | Sturm | Sept. 1, 1936 |
| 2,057,606 | Campos | Oct. 13, 1936 |
| 2,194,270 | Sundstrand | Mar. 19, 1940 |
| 2,221,861 | Butler | Nov. 19, 1940 |